United States Patent
Abuelnaga et al.

(10) Patent No.: US 11,211,879 B2
(45) Date of Patent: Dec. 28, 2021

(54) CAPACITOR SIZE REDUCTION AND LIFETIME EXTENSION FOR CASCADED H-BRIDGE DRIVES

(71) Applicant: Rockwell Automation Technologies, Inc., Mayfield Heights, OH (US)

(72) Inventors: Ahmed Hisham Abuelnaga, Hamilton (CA); Zhituo Ni, Hamilton (CA); Mehdi Narimani, Oakville (CA); Zhongyuan Cheng, Kitchener (CA); Navid R. Zargari, Kitchener (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 352 days.

(21) Appl. No.: 16/579,498

(22) Filed: Sep. 23, 2019

(65) Prior Publication Data

US 2021/0091681 A1    Mar. 25, 2021

(51) Int. Cl.
*H02M 7/5387* (2007.01)
*H02P 21/22* (2016.01)
(Continued)

(52) U.S. Cl.
CPC ......... *H02M 7/53871* (2013.01); *H02M 1/14* (2013.01); *H02M 5/4585* (2013.01);
(Continued)

(58) Field of Classification Search
CPC ........... H02M 7/5387; H02M 7/53871; H02M 7/53873; H02M 7/53875; H02M 7/53876; H02M 7/483; H02M 7/4826; H02M 5/40; H02M 5/44; H02M 5/45; H02M 5/458; H02M 5/4585; H02P 21/22; H02P 27/06
See application file for complete search history.

(56) References Cited

U.S. PATENT DOCUMENTS 4,443,841 A    4/1984    Mikami et al.
4,783,728 A    11/1988   Hoffman
(Continued)

FOREIGN PATENT DOCUMENTS

CN    1190278    8/1998
CN    1253999    5/2000
(Continued)

OTHER PUBLICATIONS

Abu-Rub et al.,"Medium-Voltage Multilevel Converters—State of the Art, Chellenges, and Requirements in Industrial Applications", IEEE Transactions on Industrial Electronics, vol. 57, No. 8, Aug. 2010, pp. 2581-2596.
(Continued)

*Primary Examiner* — Nguyen Tran
(74) *Attorney, Agent, or Firm* — Fay Sharpe LLP

(57) ABSTRACT

A power conversion system and controller configured to generate a real average DC current reference based on a DC bus voltage of a DC link circuit and a DC bus voltage setpoint, generate real and reactive ripple current references based on the DC bus voltage of the DC link circuit and a ripple angle of the DC link circuit, and generate rectifier switching control signals to operate rectifier switching devices based on the real average DC current reference and the real and reactive ripple current references.

20 Claims, 29 Drawing Sheets

(51) Int. Cl.
  *H02M 1/14* (2006.01)
  *H02M 5/458* (2006.01)
  *H02M 7/483* (2007.01)
  *H02P 27/06* (2006.01)

(52) U.S. Cl.
  CPC ............ *H02M 7/483* (2013.01); *H02P 21/22* (2016.02); *H02P 27/06* (2013.01)

(56) References Cited

U.S. PATENT DOCUMENTS

| | | |
|---|---|---|
| 4,894,621 A | 1/1990 | Koenig et al. |
| 4,978,894 A | 12/1990 | Takahara |
| 5,298,848 A | 3/1994 | Ueda et al. |
| 5,361,196 A | 11/1994 | Tanamachi et al. |
| 5,502,633 A | 3/1996 | Miyazaki et al. |
| 5,625,545 A | 4/1997 | Hammond |
| 5,638,263 A | 6/1997 | Opal et al. |
| 5,642,275 A | 6/1997 | Peng et al. |
| 5,790,396 A | 8/1998 | Miyazaki et al. |
| 5,933,339 A | 8/1999 | Duba et al. |
| 5,986,909 A | 11/1999 | Hammond et al. |
| 6,005,788 A | 12/1999 | Lipo et al. |
| 6,031,738 A | 2/2000 | Lipo et al. |
| 6,058,031 A | 5/2000 | Lyons et al. |
| 6,075,350 A | 6/2000 | Peng |
| 6,075,717 A | 6/2000 | Kumar et al. |
| 6,166,929 A * | 12/2000 | Ma .................. H02M 5/4505 363/37 |
| 6,222,284 B1 | 4/2001 | Hammond et al. |
| 6,229,722 B1 | 5/2001 | Ichikawa et al. |
| 6,236,580 B1 | 5/2001 | Aiello et al. |
| 6,269,010 B1 | 7/2001 | Ma et al. |
| 6,295,215 B1 | 9/2001 | Faria et al. |
| 6,320,767 B1 | 11/2001 | Shimoura et al. |
| 6,359,416 B1 | 3/2002 | Rao et al. |
| 6,366,483 B1 | 4/2002 | Ma et al. |
| 6,411,530 B2 | 6/2002 | Hammond et al. |
| 6,477,067 B1 | 11/2002 | Kerkman et al. |
| 6,469,916 B1 | 12/2002 | Kerkman et al. |
| 6,541,933 B1 | 4/2003 | Leggate et al. |
| 6,556,461 B1 | 4/2003 | Khersonsky et al. |
| 6,617,821 B2 | 9/2003 | Kerkman et al. |
| 6,636,012 B2 | 10/2003 | Royak et al. |
| RE38,439 E | 2/2004 | Czerwinski |
| 6,697,271 B2 | 2/2004 | Corzine |
| 6,697,274 B2 | 2/2004 | Bernet et al. |
| 6,703,809 B2 | 3/2004 | Royak et al. |
| 6,720,748 B1 | 4/2004 | Seibel et al. |
| 6,795,323 B2 | 9/2004 | Tanaka et al. |
| 6,819,070 B2 | 11/2004 | Kerkman et al. |
| 6,819,077 B1 | 11/2004 | Seibel et al. |
| 6,842,354 B1 | 1/2005 | Tallam et al. |
| 6,859,374 B2 | 2/2005 | Pollanen et al. |
| 6,982,533 B2 | 1/2006 | Seibel et al. |
| 7,034,501 B1 | 4/2006 | Thunes et al. |
| 7,057,905 B2 | 6/2006 | Macmillan |
| 7,068,526 B2 | 6/2006 | Yamanaka |
| 7,106,025 B1 | 9/2006 | Yin et al. |
| 7,164,254 B2 | 1/2007 | Kerkman et al. |
| 7,170,767 B2 | 1/2007 | Bixel |
| 7,180,270 B2 | 2/2007 | Rufer |
| 7,215,559 B2 | 5/2007 | Nondahl et al. |
| 7,274,576 B1 | 9/2007 | Zargari et al. |
| 7,336,509 B2 | 2/2008 | Tallam |
| 7,342,380 B1 | 3/2008 | Kerkman et al. |
| 7,356,441 B2 | 4/2008 | Kerkman et al. |
| 7,400,518 B2 | 7/2008 | Yin et al. |
| 7,428,158 B2 | 9/2008 | Bousfield, III et al. |
| 7,471,525 B2 | 12/2008 | Suzuki et al. |
| 7,495,410 B2 | 2/2009 | Zargari et al. |
| 7,495,938 B2 | 2/2009 | Wu et al. |
| 7,508,147 B2 | 3/2009 | Rastogi et al. |
| 7,511,976 B2 | 3/2009 | Zargari et al. |
| 7,568,931 B2 | 8/2009 | Hammond |
| 7,589,984 B2 | 9/2009 | Salomaki |
| 7,649,281 B2 | 1/2010 | Lai et al. |
| 7,738,267 B1 | 6/2010 | Tallam et al. |
| 7,800,254 B2 | 9/2010 | Hammond |
| 7,830,681 B2 | 11/2010 | Abolhassani et al. |
| 7,894,224 B2 | 2/2011 | Ulrich |
| 7,978,488 B2 | 7/2011 | Tanaka et al. |
| 8,008,923 B2 | 8/2011 | Hammond |
| 8,040,101 B2 | 10/2011 | Itoh et al. |
| 8,093,764 B2 | 1/2012 | Hammond |
| 8,107,267 B2 | 1/2012 | Tallam et al. |
| 8,130,501 B2 | 3/2012 | Ledezma et al. |
| 8,138,697 B2 | 3/2012 | Palma |
| 8,144,491 B2 | 3/2012 | Bendre et al. |
| 8,159,840 B2 | 4/2012 | Yun |
| 8,279,640 B2 | 10/2012 | Abolhassani et al. |
| 8,279,641 B2 | 10/2012 | Kawamoto et al. |
| 8,400,793 B2 | 3/2013 | Jonsson |
| 8,441,147 B2 | 5/2013 | Hammond |
| 8,508,066 B2 | 8/2013 | Lee et al. |
| 8,619,446 B2 | 12/2013 | Liu et al. |
| 8,817,499 B2 | 8/2014 | Videt |
| 8,860,380 B2 | 10/2014 | Hasler |
| 8,929,111 B2 | 1/2015 | White |
| 9,036,379 B2 | 5/2015 | Schroeder |
| 9,318,976 B1 | 4/2016 | Wei et al. |
| 9,325,252 B2 | 4/2016 | Narimani et al. |
| 9,520,800 B2 | 12/2016 | Tian et al. |
| 9,559,541 B2 | 1/2017 | Cheng et al. |
| 2001/0048290 A1 | 12/2001 | Underwood et al. |
| 2005/0128777 A1 | 6/2005 | Yamanaka et al. |
| 2006/0267542 A1 | 11/2006 | Wei et al. |
| 2007/0211501 A1 | 9/2007 | Zargari et al. |
| 2007/0297202 A1 | 12/2007 | Zargari et al. |
| 2008/0019157 A1 | 1/2008 | Salomaki |
| 2008/0079314 A1 | 4/2008 | Hammond |
| 2008/0081244 A1 | 4/2008 | Hammond |
| 2008/0088186 A1 | 4/2008 | Hammond |
| 2008/0151583 A1 | 6/2008 | Matsumoto |
| 2008/0174182 A1 | 7/2008 | Hammond |
| 2008/0180055 A1 | 7/2008 | Zargari et al. |
| 2008/0278109 A1 | 11/2008 | Qian et al. |
| 2009/0058350 A1 | 3/2009 | Wei et al. |
| 2009/0073622 A1 | 3/2009 | Hammond |
| 2009/0085510 A1 | 4/2009 | Pande et al. |
| 2009/0128083 A1 | 5/2009 | Zargari |
| 2009/0175059 A1 | 7/2009 | Sakakibara |
| 2009/0184681 A1 | 7/2009 | Kuno |
| 2010/0025995 A1 | 2/2010 | Lang et al. |
| 2010/0078998 A1 | 4/2010 | Wei et al. |
| 2010/0080028 A1 | 4/2010 | Cheng et al. |
| 2010/0085789 A1 | 4/2010 | Ulrich et al. |
| 2010/0091534 A1 | 4/2010 | Tadano |
| 2010/0109585 A1 | 5/2010 | Iwahori et al. |
| 2010/0141041 A1 | 6/2010 | Bose et al. |
| 2010/0301975 A1 | 12/2010 | Hammond |
| 2011/0019449 A1 | 1/2011 | Katoh et al. |
| 2011/0095603 A1 | 4/2011 | Lee et al. |
| 2011/0141777 A1 | 6/2011 | Sakakibara |
| 2011/0176340 A1 | 7/2011 | Sakakibara |
| 2011/0249479 A1 | 10/2011 | Capitaneanu et al. |
| 2012/0057380 A1 | 3/2012 | Abe |
| 2012/0057384 A1 | 3/2012 | Jones |
| 2012/0113698 A1 | 5/2012 | Inoue |
| 2012/0140532 A1 | 6/2012 | Tallam et al. |
| 2012/0163046 A1 | 6/2012 | Hibino |
| 2012/0195078 A1 | 8/2012 | Kroeze et al. |
| 2012/0195079 A1 | 8/2012 | Kroeze et al. |
| 2012/0201056 A1 | 8/2012 | Wei |
| 2012/0212982 A1 | 8/2012 | Wei et al. |
| 2012/0218795 A1 | 8/2012 | Mihalache |
| 2012/0229061 A1 | 9/2012 | Itoh et al. |
| 2013/0010504 A1 | 1/2013 | Xiao et al. |
| 2013/0057297 A1* | 3/2013 | Cheng .................. G01R 31/64 324/548 |
| 2013/0121041 A1 | 5/2013 | Schroeder et al. |
| 2013/0121042 A1 | 5/2013 | Gan et al. |
| 2013/0180273 A1 | 7/2013 | Hatakeyama et al. |
| 2013/0223651 A1 | 8/2013 | Hoyerby |

(56) References Cited

U.S. PATENT DOCUMENTS

| | | |
|---|---|---|
| 2013/0249501 A1 | 9/2013 | Lu et al. |
| 2013/0272045 A1 | 10/2013 | Soeiro |
| 2013/0291578 A1 | 11/2013 | Hatakeyama et al. |
| 2013/0300380 A1 | 11/2013 | Brunotte et al. |
| 2014/0003099 A1 | 1/2014 | Dillig et al. |
| 2014/0036557 A1 | 2/2014 | Liu et al. |
| 2014/0042817 A1 | 2/2014 | Zargari et al. |
| 2014/0056038 A1 | 2/2014 | Yamamoto et al. |
| 2014/0063870 A1 | 3/2014 | Bousfield, III |
| 2014/0146586 A1 | 5/2014 | Das et al. |
| 2014/0204632 A1 | 7/2014 | Noetzold et al. |
| 2014/0268928 A1 | 9/2014 | Wie et al. |
| 2014/0268953 A1 | 9/2014 | Patel et al. |
| 2014/0268954 A1 | 9/2014 | Wei et al. |
| 2014/0300298 A1 | 10/2014 | Liu et al. |
| 2014/0369089 A1 | 12/2014 | Sakakibara |
| 2014/0376287 A1 | 12/2014 | Wu et al. |
| 2015/0009731 A1 | 1/2015 | Kim |
| 2015/0146462 A1 | 5/2015 | Yamanaka |
| 2015/0171733 A1 | 6/2015 | Zargari et al. |
| 2015/0241503 A1* | 8/2015 | Bhandarkar ........ H02M 5/4585 363/44 |
| 2015/0280608 A1 | 10/2015 | Yoscovich et al. |
| 2015/0318791 A1 | 11/2015 | Baumann et al. |
| 2015/0355259 A1 | 12/2015 | Sartler et al. |
| 2015/0355262 A1 | 12/2015 | Hu et al. |
| 2016/0006367 A1 | 1/2016 | Wei et al. |
| 2016/0013715 A1 | 1/2016 | Patel et al. |
| 2016/0126861 A1 | 5/2016 | Wei et al. |
| 2016/0248334 A1 | 8/2016 | Patel et al. |
| 2016/0268948 A1 | 9/2016 | Choi et al. |
| 2017/0353138 A1 | 12/2017 | Zhang et al. |
| 2017/0366082 A1 | 12/2017 | Liu et al. |
| 2018/0145602 A1 | 5/2018 | Wei et al. |

FOREIGN PATENT DOCUMENTS

| | | |
|---|---|---|
| CN | 1414692 | 4/2003 |
| CN | 2577503 | 10/2003 |
| CN | 190885 C | 2/2005 |
| CN | 1400731 A | 3/2005 |
| CN | 2737060 | 10/2005 |
| CN | 1925289 | 3/2007 |
| CN | 101795057 A | 8/2010 |
| CN | 102005960 A | 4/2011 |
| CN | 102195460 A | 9/2011 |
| CN | 102290828 A | 12/2011 |
| CN | 102522913 A | 6/2012 |
| CN | 102624025 A | 8/2012 |
| CN | 102739030 A | 10/2012 |
| CN | 102983568 A | 3/2013 |
| CN | 103051167 A | 4/2013 |
| CN | 103051236 A | 4/2013 |
| CN | 103078539 A | 5/2013 |
| CN | 103312257 A | 9/2013 |
| CN | 103337951 A | 10/2013 |
| EP | 0874448 | 10/1998 |
| EP | 1641111 A2 | 3/2006 |
| EP | 1713168 A3 | 10/2006 |
| EP | 2568591 A1 | 3/2013 |
| EP | 2698912 A2 | 2/2014 |
| EP | 2838189 A2 | 2/2015 |
| ES | 2378865 | 4/2012 |
| GB | 1295261 A | 11/1972 |
| GB | 2345594 A | 7/2000 |
| JP | 2006223009 | 8/2006 |
| JP | 2012147613 A | 8/2012 |
| JP | 2013012674 | 1/2013 |
| KR | 20080061641 A | 7/2008 |
| TW | 439350 | 6/2001 |
| WO | WO 2006107548 A1 | 10/2006 |
| WO | WO2012105737 A1 | 8/2012 |
| WO | WO2013091675 A1 | 6/2013 |
| WO | WO2013104418 A1 | 7/2013 |
| WO | WO2015155112 A1 | 10/2015 |

OTHER PUBLICATIONS

Akagi et al., "A Passive EMI Filter for Eliminating Both Bearing Current and Ground Leakage Current From an Inverter-Driven Motor", IEEE Transactions on Power Electronics, 2006 , pp. 1459-1469.

Akagi et al., "An Approach to Eliminating High-Frequency Shaft Voltage and Ground Leakage Current From an Inverter-Driven Motor", IEEE Transactions on Industry Applications, 2004 , pp. 1162-1169.

Altivar 1000, "The new range of medium-voltage variable speed drives", Hi-performance compact designs from 0.5 to 10MW, Schneider Electric-Automation—Motion & Drives, Jul. 2008, 34 pgs, obtained from the World Wide Web Apr. 2013.

Angulo, Mauricio, et al., "Level-shifted PMW for Cascaded Multilevel Inverters with Even Power Distribution", IEEE Power Electronics Specialists Conference (PESC), pp. 2373-2378, Jun. 2007.

Apeldoorn et al., "A 16 MVA ANPC-PEBB with 6 ka IGCTs," in Conf. Rec. 40th IEEE IAS Annu. Meeting, Oct. 2-6, 2005, vol. 2, pp. 818-824.

Barbosa et al., "Active neutral-point-clamped multilevel converters," in Proc. IEEE 36th Power Electron. Spec. Conf., Jun. 16, 2005, pp. 2296-2301.

Bruckner et al., "The active NPC converter and its loss-balancing control," IEEE Trans. Ind. Electron., vol. 52, No. 3, pp. 855-868, Jun. 2005.

Cacciato et al., "Modified space-vector-modulation technique for common mode currents reduction and full utilization of the DC bus", in Proc. IEEE APEC Conf. Rec., 2009, pp. 109-115.

Cacciato et al., "Reduction of common mode currents in PWM inverter motor drives", IEEE Trans. Ind. Appl., vol. 35, No. 2, pp. 469-476, Mar./Apr. 1999.

Cavalcanti et al., "Modulation Techniques to Eliminate Leakage Currents in Transformerless Three-Phase Photovoltaic Systems", IEEE Transactions on Industrial Electronics, 2010 , pp. 1360-1368.

Celanovic et al., "A Comprehensive Study of Neutral-Point Voltage Balancing Problem in Three-Level Neutral-Point-Clamped Voltage Source PWM Inverters", IEEE Transactions on Power Electronics, vol. 15, No. 2, Mar. 2000, pp. 242-249.

Cengelci, E., et al., A New Medium Voltage PWM Inverter Topology for Adjustable Speed Drives, IEEE, 0-7803-4943-1, 1998, pp. 1416-1423.

Cha, Han Ju et al. An Approach to Reduce Common-Mode Voltage in Matrix Converter, Jul./Aug. 2003, IEEE, vol. 39, pp. 1151-1159.

Cha, Han Ju, "Analysis and Design of Matrix Converter for Adjustable Speed Drive and Distributed Power Sources", Aug. 2004, Texas A&M Univ., Doctor of Philosophy Dissertation Paper.

Chaudhuri, Toufann, et al., Introducing the Common Cross Connected Stage ($C^3S$) for the 5L ANPC Multilevel Inverter, IEEE, 978-1-4244-1668-4, 2008, pp. 167-173.

Cheng et al., "A novel switching sequence design for five-level NPC/H-bridge inverters with improved output voltage spectrum and minimized device switching frequency," IEEE Trans. Power Electron., vol. 22, No. 6, pp. 2138-2145, Nov. 2007.

Choi et al., "A General Circuit Topology of Multilevel Inverter", Dept. of Electrical Engineering, Korea Advanced Institute of Science and Technology (KAIST), 1991 IEEE, 8 pgs.

De Broe, et al., "Neutral-To-Ground Voltage Minimization in a PWM-Rectifier/Inverter Configuration", Power Electronics and Variable Speed Drives, Sep. 23-25, 1996, Conference Publication No. 429, IEEE, 1996.

Erdman, Russel J. Kerkman, David W. Schlegel, and Gary L. Skibinski, "Effect of PWM Inverters on AC Motor Bearing Currents and Shaft Voltages", 1996 IEEE.

Etxeberria-Otadui et al., Gaztaaga, U. Viscarret, and M. Caballero, "Analysis of a H-NPC topology for an AC traction front-end converter," in Proc. 13th EPE-PEMC, Sep. 1-3, 2008, pp. 1555-1561.

(56) References Cited

OTHER PUBLICATIONS

Floricau, Dan et al., A new stacked NPC converter: 3L-topology and control, Proceedings of the 12th European Conf. on Power Electronics and Applications, EPE 2007, EPE Association, 2007, 10 pgs.
Glinka, M., Prototype of Multiphase Modular-Multilevel-Converter with 2 MW power rating and 17-level-output-voltage, IEEE, 0-7803-8399-0, 2004, pp. 2572-2576.
Guennegues et al., "Selective harmonic elimination PWM applied to H-bridge topology in high speed applications," in Proc. Int. Conf. POWERENG, Mar. 18-20, 2009, pp. 152-156.
Guennegues, V., et al., A Converter Topology for High Speed Motor Drive Applications, IEEE Xplore, 2009, 8 pgs.
Gupta et al., "A Space Vector Modulation Scheme to Reduce Common Mode Voltage for Cascaded Multilevel Inverters", IEEE Transactions on Power Electronics, vol. 22, No. 5, Sep. 2007, pp. 1672-1681.
Hava et al., "A high-performance PWM algorithm for common-mode voltage reduction in three-phase voltage source inverters," IEEE Trans. Power Electron., vol. 26, No. 7, pp. 1998-2008, Jul. 2011.
Hiller, Mark et al., Medium-Voltage Drives; An overview of the common converter topologies and power semiconductor devices, IEEE Industry Applications Magazine, Mar.-Apr. 2010, pp. 22-30.
Horvath, "How isolation transformers in MV drives protect motor insulation", TM GE Automation Systems, Roanoke, VA, 2004.
Hua, Lin, "A Modulation Strategy to Reduce Common-Mode Voltage for Current-Controlled Matrix Converters", Nov. 2006, IEEE Xplore, pp. 2775-2780.
Iman-Eini, Hossein et al., "A Fault-Tolerant Control Strategy for Cascaded H-Bridge Multilevel Rectifiers", Journal of Power Electronics, vol. 1, Jan. 2010.
Kerkman, et al., "PWM Inverters and Their Influence on Motor Over-Voltage," 1997 IEEE.
Khomfoi, Surin et al., "Fault Detection and Reconfiguration Technique for Cascaded H-bridge 11-level Inverter Drives Operating under Faulty Condition", 2007 IEEE, PEDS 2007, pp. 1035-1042.
Kieferndorf et al., "A new medium voltage drive system based on anpc-5l technology," in Proc. IEEE-ICIT, Viña del Mar, Chile, Mar. 2010, pp. 605-611.
Kim et al., "A New PWM Strategy for Common-Mode Voltage Reduction in Neutral-Point-Clamped Inverter-Fed AC Motor Drives", IEEE Translations on Industry Applications, vol. 37, No. 6, Nov. 2001, pp. 1480-1845.
Kouro et al., "Recent advances and industrial applications of multilevel converters," IEEE Trans. Ind. Electron., vol. 57, No. 8, pp. 2553-2580, Aug. 2010.
Lai et al., "Optimal common-mode voltage reduction PWM technique for inverter control with consideration of the dead-time effects-part I: basic development," IEEE Trans. Ind. Appl., vol. 40, No. 6, pp. 1605-1612, Nov./Dec. 2004.
Lee, Hyeoun-Dong et al., "A Common Mode Voltage Reduction in Boost Rectifier/Inverter System by Shifting Active Voltage Vector in a Control Period", IEEE Transactions on Power Electronics, vol. 15, No. 6, Nov. 2000.
Lesnicar et al., "An Innovative Modular Multilevel Converter Topology Suitable for a Wide Power Range", 2003 IEEE Bologna PowerTech Conference, Jun. 23-26, Bologna Italy, 6 pgs.
Lesnicar, A., et al., A new modular voltage source inverter topology, Inst. of Power Electronics and Control, Muenchen, DE, Oct. 10, 2007, pp. 1-10.
Lezana, Pablo et al., "Survey on Fault Operation on Multilevel Inverters", IEEE Transactions on Industrial Electronics, vol. 57, No. 7, Jul. 2010, pp. 2207-2217.
Li, Jun, et al., A New Nine-Level Active NPC (ANPC) Converter for Grid Connection of Large Wind Turboines for Distributed Generation, IEEE Transactions on Power Electronics, vol. 26, No. 3, Mar. 2011, pp. 961-972.
Loh et al., "Reduced Common-Mode Modulation Strategies for Cascaded Multilevel Inverters", IEEE Transaction on Industry Applications, vol. 39, No. 5, Sep. 2003, pp. 1386-1395.

McGrath, Brendan Peter et al., "Multicarrier PMW Strategies for Multilevel Inverters," IEEE Transactions on Industrial Electronics, vol. 49, No. 4, pp. 858-867, Aug. 2002.
Meili et al., "Optimized pulse patterns for the 5-level ANPC converter for high speed high power applications," in Proc. 32nd IEEE IECON, Nov. 6-10, 2006, pp. 2587-2592.
Muetze & A. Binder, "Don't lose Your Bearings", Mitigation techniques for bearing currents in inverter-supplied drive systems, 2006 IEEE.
Naik et al., "Circuit model for shaft voltage prediction in induction motors fed by PWMbased AC drives", IEEE Trans. Ind. Appl., vol. 39, No. 5, pp. 1294-1299, Nov./Dec. 1996.
O-Harvest, product information, Beijing Leader & Harvest Electric Technologies Co., Ltd., http:/www.1d-harvest.com/en/3-1-2.htm, retrieved from the Internet Apr. 11, 2013, 3 pgs.
Park, Young-Min, "A Simple and Reliable PWM Synchronization & Phase-Shift Method for Cascaded H-Bridge Multilevel Inverters based on a Standard Serial Communication Protocol", IEEE 41st IAS Annual Meeting, pp. 988-994, Oct. 2006.
Peng, "A Generalized Multilevel Inverter Topology with Self Voltage Balancing", IEEE Transactions on Industry Applications, vol. 37, No. 2, Mar./Apr. 2001, pp. 611-618.
Perez, Marcelo A., et al. "Regenerative medium-voltage AC drive based on a multicell arrangement with reduced energy storage requirements." IEEE Transactions on Industrial Electronics 52.1 (2005): 171-180.
Rashidi-Rad et al., "Reduction of Common-Mode Voltage in an Even Level Inverter by a New SVM Method", Int'l Journal of Advanced Computer Science, vol. 2, No. 9, pp. 343-347, Sep. 2012.
Rendusara, et al., "Analysis of common mode voltage-'neutral shift' in medium voltage PWM adjustable speed drive (MV-ASD) systems", IEEE Trans. Power Electron., vol. 15, No. 6, pp. 1124-1133, Nov. 2000.
Robicon Perfect Harmony, "Medium-Voltage Liquid-Cooled Drives", Siemens, Catalog D 15.1, 2012, USA Edition, obtained from the World Wide Web Apr. 2013, 91 pgs. (Downloaded to EFS Web as Part 1, pp. 1-49; and Part 2, pp. 50-91).
Robicon Perfect Harmony, "The Drive of Choice for Highest Demands", Siemens, Copyright Siemens AG 2008, 16 pgs, obtained from the World Wide Web Apr. 2013.
Robicon, "Perfect Harmony MV Drive Product Overview", 18 pgs.. obtained from the World Wide Web Apr. 2013.
Rodriguez et al., "A New Modulation Method to Reduce Common-Mode Voltages in Multilevel Inverters", IEEE Transactions on Industrial Electronics, vol. 51, No. 4, Aug. 2004, 834-939.
Rodriguez et al., "Multilevel inverters: A survey of topologies, controls, and applications," IEEE Trans. Ind. Electron., vol. 49, No. 4, pp. 724-738, Aug. 2002.
Rodriguez et al., "Operation of a Medium-Voltage Drive Under Faulty Conditions", IEEE Transactions on Industrial Electronics, vol. 52, No. 4, Aug. 2005, pp. 1080-1085.
Rodriguez, et al., "Multilevel voltage source—converter topologies for industrial medium-voltage drives," IEEE Trans. Ind. Electron., vol. 54, No. 6, pp. 2930-2945, Dec. 2007.
Saeedifard, et al., "Operation and control of a hybrid seven-level converter," IEEE Trans. Power Electron., vol. 27, No. 2, pp. 652-660, Feb. 2012.
Saeedifard, Maryann et al., Analysis and Control of DC-Capacitor-Voltage-Drift Phenomenon of a Passive Front-End Five-Level Converter, IEEE Transactions on Industrial Electronics, vol. 54, No. 6, Dec. 2007, pp. 3255-3266.
Sedghi, S. et al., "A New Multilevel Carrier Based Pulse Width Modulation Method for Modular Multilevel Inverter", IEEE, 8th International Conference on Power Electronics—ECCE Asia (ICPE & ECCE), pp. 1432-1439, May 30-Jun. 3, 2011.
Sepahvand, Hossein et al., "Fault Recovery Strategy for Hybrid Cascaded H-Bridge Multi-Level Inverters", 2011 IEEE, pp. 1629-1633.
Serpa et al., "Fivelevel virtual-flux direct power control for the active neutral-point clamped multilevel inverter," in Proc. IEEE Power Electron. Spec. Conf.

(56) References Cited

OTHER PUBLICATIONS

Silva, Cesar et al., Control of an Hybrid Multilevel Inverter for Current Waveform Improvement, IEEE, 978-1-4244-1666-0, 2008, pp. 2329-2335.

Song, Wenchao et al., "Control Strategy for Fault-Tolerant Cascaded Multilevel Converter based STATCOM", 2007 IEEE, pp. 1073-1076.

Ulrich, James A., et al., Floating Capacitor Voltage Regulation in Diode Clamped Hybrid Multilevel Converters, IEEE, 978-1-4244-3439-8, 2009, pp. 197-202.

Un et al., "A near-state PWM method with reduced switching losses and reduced common-mode voltage for three-phase voltage source inverters," IEEE Trans. Ind. Appl., vol. 45, No. 2, pp. 782-793, Mar./Apr. 2009.

Wang, "Motor shaft voltages and bearing currents and their reduction in multilevel medium-voltage PWM voltage-source-inverter drive applications", IEEE Trans. Ind. Appl., vol. 36, No. 5, pp. 1336-1341, Sep./Oct. 2000.

Wei, Sanmin et al., "Control Method for Cascaded H-Bridge Multilevel Inverter with Faulty Power Cells", 2003 IEEE, pp. 261-267.

Wen, Jun et al., Synthesis of Multilevel Converters Based on Single-and/or Three-Phase Converter Building Blocks, IEEE Transactions on Power Electronics, vol. 23, No. 3, May 2008, pp. 1247-1256.

Wu et al., "A five-level neutral-point-clamped H-bridge PWM inverter with superior harmonics suppression: A theoretical analysis," in Proc. IEEE Int. Symp. Circuits Syst., Orlando, FL, May 30-Jun. 2, 1999, vol. 5, pp. 198-201.

Wu, Bin, "EE8407 Power Converter Systems", Topic 6, Multilevel Cascaded H-Bridge (CHB) Inverters, pp. 1-14, 2006.

Wu, Bin, "High-Power Converters and AC Drives", Wiley-IEEE Press, 2006, Chapter 7, pp. 119-142.

Wu, Bin, "High-Power Converters and AC Drives", Wiley-IEEE Press, 2006, Chapter 9, pp. 179-186.

Wu, High-Power Converters and AC Drives. New York/Piscataway, NJ: Wiley/IEEE Press, 2006, Ch. 1.

Yang, et al. An Integrated Dual Voltage Loop Control for Capacitance Reduction in CHB=based Regenerative Motor Drive Systems. IEEE Transactions on Industrial Electronics. Jul. 16, 2018, 11 pages.

Yang, et al. "Power Decoupling Control for Capacitance Reduction in Cascaded H-Bridge Converter-based Regenerative Motor Drive Systems." IEEE Transactions on Power Electronics. Mar. 23, 2018, 12 pages.

Yantra Harvest Energy Pvt. Ltd., "Medium Voltage Drives", www.yantraharvest.com, obtained from the World Wide Web Apr. 2013.

Yin, et al., "Analytical Investigation of the Switching Frequency Harmonic Characteristic for Common Mode Reduction Modulator", 2005 IEEE.

Zhang et al., "A Multilevel Converter Topology with Common Flying Capacitors", IEEE 978-1-4799-0336, 2013, pp. 1274-1280.

Zhang et al., "Multilevel Inverter Modulation Schemes to Eliminate Common-Mode Voltages", IEEE Transactions on Industry Applications, vol. 36, No. 6, Nov./Dec. 2000, pp. 1645-1653.

Zhao, et al., "Hybrid Selective Harmonic Elimination PWM for Common-Mode Voltage Reduction in Three-Level Neutral-Point-Clamped Inverters for Variable Speed Induction Drives", IEEE Transactions on Power Electronics, 2012 , pp. 1152-1158.

Zhao, Jing et al., "A Novel PWM Control Method for Hybrid-Clamped Multilevel Inverters", IEEE Transactions on Industrial Electronics, vol. 57, No. 7, pp. 2365-2373, Jul. 2010.

Zhu et al., An Integrated AC Choke Design for Common-Mode Current Suppression in Neutral-Connected Power Converter Systems. IEEE Transactions on Power Electronics, 2012 , pp. 1228-1236.

Extended European Search Report dated Jan. 22, 2021 of corresponding European Patent Application No. 20189502.6-1202, 8 pages.

\* cited by examiner

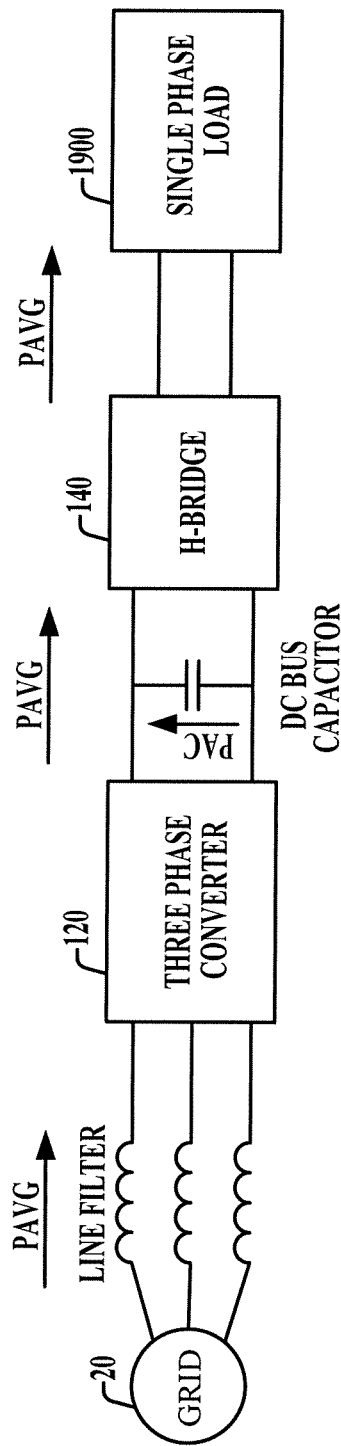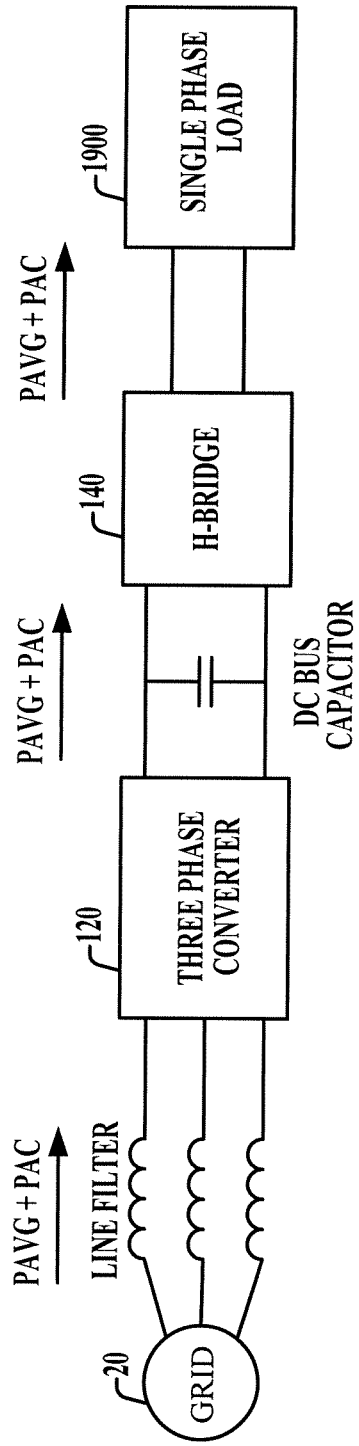
FIG. 19
FIG. 20

CAPACITOR SIZE REDUCTION AND LIFETIME EXTENSION FOR CASCADED H-BRIDGE DRIVES

BACKGROUND

Multilevel inverters are sometimes employed in motor drives and other power conversion applications to generate and provide high voltage drive signals to a motor or other load in high power applications. One form of multilevel inverter is a Cascaded H-Bridge (CHB) inverter architecture, which employs multiple series-connected power stages such as H-Bridge inverters for driving each motor winding phase.

SUMMARY

Various aspects of the present disclosure are now summarized to facilitate a basic understanding of the disclosure, wherein this summary is not an extensive overview of the disclosure and is intended neither to identify certain elements of the disclosure, nor to delineate the scope thereof. Rather, the primary purpose of this summary is to present various concepts of the disclosure in a simplified form prior to the more detailed description that is presented hereinafter. A power conversion system, computer readable medium and controller configured to generate a real average DC current reference based on a DC bus voltage of a DC link circuit and a DC bus voltage setpoint, generate a reactive ripple current reference based on the DC bus voltage of the DC link circuit and a ripple angle of the DC link circuit, and generate rectifier switching control signals to operate rectifier switching devices based on the real average DC current reference and the reactive ripple current reference. In one example, the controller generates a real ripple current reference based on the DC bus voltage of the DC link circuit and the ripple angle, and generates the rectifier switching control signals based on the real average DC current reference, the real ripple current reference, and the reactive ripple current reference.

BRIEF DESCRIPTION OF THE DRAWINGS

FIG. 19 is a schematic diagram.
FIG. 20 is a schematic diagram.

DETAILED DESCRIPTION

Figure 1:
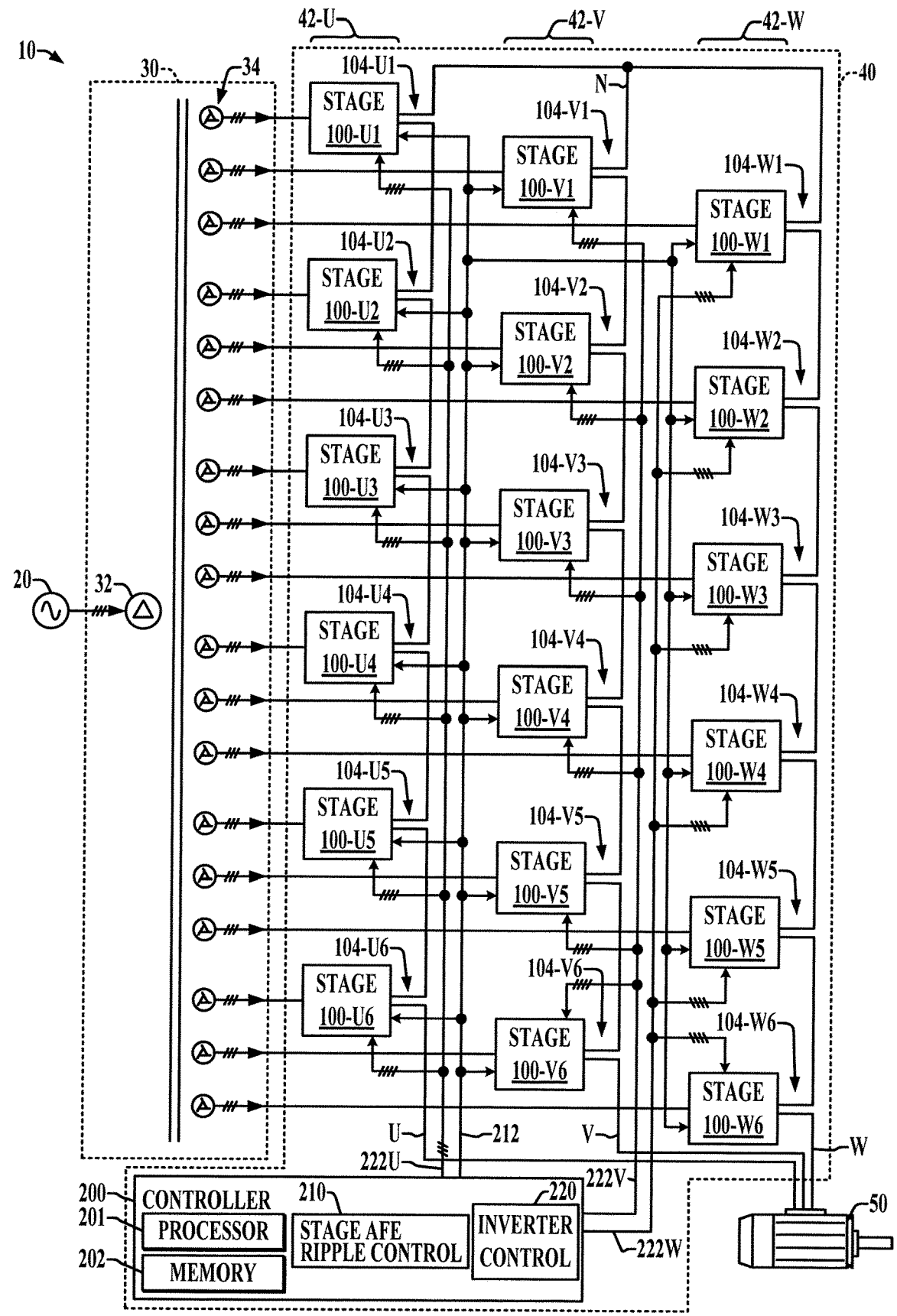
FIG. 1 is a schematic diagram.

Referring now to the figures, several embodiments or implementations are hereinafter described in conjunction with the drawings, wherein like reference numerals are used to refer to like elements throughout, and wherein the various features are not necessarily drawn to scale. Multilevel inverters are sometimes employed in motor drives and other power conversion applications to generate and provide high voltage drive signals to a motor or other load in high power applications. One form of multilevel inverter is a Cascaded H-Bridge (CHB) inverter architecture, which employs multiple series-connected power stages such as H-Bridge inverters for driving each motor winding phase. Each H-Bridge is powered by a separate DC source and is driven by switch signals to generate positive or negative output voltage, with the series combination of multiple H-Bridge stages providing multilevel inverter output capability for driving a load.

Figure 2:
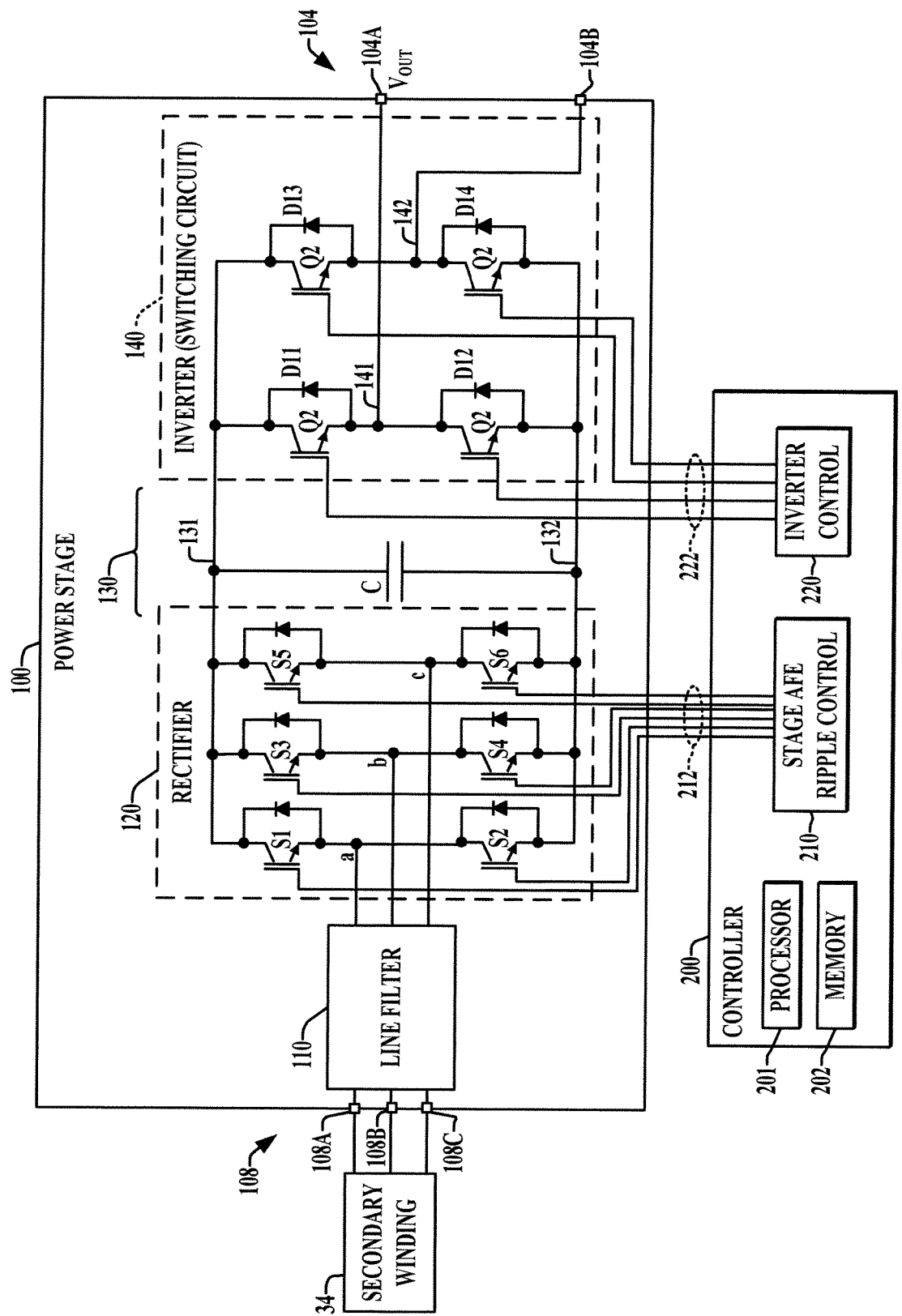
FIG. 2 is a schematic diagram.

Referring initially to FIGS. 1 and 2, FIG. 1 illustrates an example multilevel inverter motor drive power conversion system 10 which includes a three-phase multilevel inverter 40 with series-connected power stages 100-1, 100-2, 100-3, 100-4, 100-5, 100-6 for each of three sections associated with the motor phases U, V and W of a motor load 50. Other embodiments are possible in which other forms of load 50 are driven, wherein the present disclosure is not limited to motor drive type power converters. In certain embodiments, the individual power stages 100 include an H-bridge switching circuit or inverter 140 with switching devices (e.g., Q1-Q4 in FIG. 2 below), although any suitable form of switching circuit 140 may be provided in the individual power stages 100 for generating a power stage output having one of two or more possible levels based on switching control signals 222 provided by an inverter control component 220 of a power converter controller 200. The present disclosure provides advanced active front end (AFE) rectifier control apparatus and techniques which are hereinafter described in the context of the multilevel inverter motor drive power conversion system 10 and variations thereof. In other implementations, the disclosed rectifier controller and methods can be used in any active rectifier system, including a motor drive or other power conversion system including an active rectifier with or without an associated inverter. In one possible implementation, the disclosed apparatus and techniques can be used in association with a cascaded neutral point clamped (CNPC) power conversion system including a neutral point clamped inverter as H-bridge legs.

The example of FIG. 1 is a multiphase 13-level inverter 40 with six power stages 100 for each of three motor load phases U, V and W (e.g., 100-U1, 100-U2, 100-U3, 100-U4, 100-U5 and 100-U6 for phase U; 100-V1, 100-V2, 100-V3, 100-V4, 100-V5 and 100-V6 for phase V; and stages 100-W1, 100-W2, 100-W3, 100-W4, 100-W5, 100-W6 for phase W). However, the various aspects of the present disclosure may be implemented in association with single phase or multiphase, multilevel inverter type power conversion systems having any integer number "N" power stages 100, where N is greater than one. In addition, although the illustrated embodiments utilize H-Bridge stages 100 cascaded to form multilevel inverters 40 for each phase of the motor drive system 10, other types and forms of power stages 100 can be used, such as a stage 100 with a switching circuit having more or less than four switching devices, wherein the broader aspects of the present disclosure are not limited to H-Bridge power stages or sub stages shown in the illustrated embodiments. For instance, embodiments are possible, in which the individual stages or sub stages may include as few as two switching devices or any integer number of switches greater than or equal to two.

As best seen in FIG. 1, the power converter 10 is supplied with multiphase AC input power from a phase shift transformer 30 having a multiphase primary 32 (a delta configuration in the illustrated embodiment) receiving three-phase power from an AC power source 20. The transformer 30 includes 18 three-phase secondaries 34, with six sets of three delta-configured three-phase secondaries 34, with each set being at a different phase relationship. Although the primary 32 and the secondaries 34 are configured as delta windings in the illustrated example, "Y" connected primary windings and/or secondary windings can alternatively be used. In addition, while the transformer has three-phase primary and secondary windings 32, 34, other single or multiphase implementations can be used. In addition, the various secondaries 34 in the illustrated embodiments are phase shifted, although non-phase shifted embodiments are possible. Each of the three-phase secondaries 34 in the example of FIG. 1 is coupled to provide AC power to drive a three-phase rectifier 120 of a corresponding power stage 100 of the three-phase multilevel inverter 40. The inverter 40 is a 13-level inverter with six cascaded H-Bridge power stages 100U-1 through 100U-6 having outputs 104U-1 through 104U-6 connected in series with one another (cascaded) between a motor drive neutral point N and a first winding U of a three-phase motor load 50.

The converter 40 includes three multilevel phase circuits 42-U, 42-V and 42-W. The individual phase circuits 42 include three regenerative power stages 100 for 7-level output operation of each phase (power stages 100U-1 through 100U-3 for phase U, 100W-1 through 100W-3 for phase V, and 100W-1 through 100W-3 for phase W) with respective power stage outputs 104 connected in series. Six power stages 100V-1 through 100V-6 provide series connected voltage outputs 104V-1 through 104V-6 between the neutral N and the second winding V, and six power stages 100W-1 through 100W-6 provide series connected voltage outputs 104W-1 through 104W-6 between the neutral N and the third winding W of the motor 50.

FIG. 2 illustrates one possible implementation of an H-Bridge power stage 100. The power stage in FIG. 2 is implemented as a power stage 100 including an AC input 108 with input terminals 108A, 108B and 108C connectable to receive AC input power, in this case three-phase power from an AC source such as a secondary winding 34 of the transformer 30 in FIG. 1. The AC input power is provided from the terminals 108 to a rectifier circuit 120 having onboard rectifier switches S1-S6 forming a three-phase rectifier 120 which receives three-phase AC power from the corresponding transformer secondary 34. The power stage 100 also includes a DC link circuit 130 and a switching circuit (e.g., inverter 140) providing an output voltage $V_{OUT}$ to a power stage output 104 having first and second output terminals 104A and 104B. In the illustrated embodiment, the rectifier 120 provides DC power across a DC capacitor C connected between DC link terminals 131 and 132 of the DC link circuit 130.

The DC link circuit 130, in turn, provides an input to an H-Bridge inverter 140 formed by four switching devices Q1-Q4 configured in an "H" bridge circuit. Any suitable switching circuit configuration can be used in the switching circuits 140 (e.g., inverter) of individual stages 100 having at least two switching devices Q configured to selectively provide voltage at the stage output 104 of at least two distinct levels. Moreover, any suitable type of switching devices Q may be used in the power stages 100, including without limitation semiconductor-based switches such as insulated gate bipolar transistors (IGBTs), silicon controlled rectifiers (SCRs), gate turn-off thyristors (GTOs), integrated gate commutated thyristors (IGCTs), etc. The illustrated four-switch H-Bridge implementation allows selective switching control signal generation by the controller 200 to provide at least two distinct voltage levels at the output 104 in a controlled fashion. For instance, a voltage is provided at the output terminals 104A and 104B of a positive DC level substantially equal to the DC bus voltage across the DC link capacitor C (e.g., +Vdc) when the switching devices Q1 and Q4 are turned on (conductive) while the other devices Q2 and Q3 are off (nonconductive). Conversely, a negative output is provided when Q2 and Q3 are turned on while Q1 and Q4 are off (e.g., −Vdc). Accordingly, the example H-Bridge power stage 100 allows selection of two different output voltages, and the cascaded configuration of six such stages (e.g., FIG. 1) allows selective switching control signal generation by the inverter control component 220 to implement 13 different voltage levels for application to the corresponding motor phase U, V or W. Other possible switching circuitry may be used to implement a two, three, or K-level selectable output for individual stages 100, where K is any positive integer greater than 1. Any suitable logic or circuitry in the controller 200 can be used for providing inverter switching control signals 222 to a given power stage 100, 400, where the controller 200 may also include signal level amplification and/or driver circuitry (not shown) to provide suitable drive voltage and/or current levels sufficient to selectively actuate the switching devices Q1-Q4, for instance, such as comparators, carrier wave generators or digital logic and signal drivers.

The power converter controller 200 includes a processor 201, a memory 202, and a stage active front end (AFE) control component or AFE controller 210 that provides rectifier switching control signals 212 to operate the rectifier switching devices S1-S6. The controller 200 also includes an inverter control component or inverter controller 220 that provides control signals 222U to the power stages 100U-1 through 100U-6 associated with the first motor winding U, and also provides control signals 222V to the power stages 100V-1 through 100V-6 and control signals 222W to the power stages 100W-1 through 100W-6. The controller 200 and its components 210, 220 can be implemented using any suitable hardware, processor executed software or firmware, or combinations thereof, wherein an exemplary embodiment of the controller 200 includes a processor 201 that can be one or more processing elements such as microprocessors, microcontrollers, DSPs, programmable logic, etc., along with electronic memory 202 that includes program and data storage, as well as signal conditioning and driver circuitry. The processing element(s) are programmed or otherwise configured to generate signals 222 suitable for operating the switching devices of the power stages 100.

Described examples also include methods and non-transitory computer readable mediums (e.g., the memory 202) with computer executable program instructions which, when executed by a processor (e.g., processor 201), cause the processor to implement a method to control a multiphase multilevel regenerative power converter, such as the example converter 40 above with multilevel phase circuits 42 that individually include multiple power stages 100 with respective power stage outputs 104 connected in series. FIG. 2 also schematically illustrates an example of one of the individual power stages 100, including an optional power stage filter 110, the active front and switching rectifier 120 (e.g., including rectifier switching devices S1-S6 connected as shown in FIG. 2 between a respective one of the secondary circuits 34 and a respective one of the first and second DC link nodes 131, 132), and the switching inverter 140 (e.g., including the inverter switching devices Q1-Q4 individually connected as shown in FIG. 2 between a respective one of the first and second DC link nodes 131, 132 and the respective power stage output 104).

The example multiphase multilevel regenerative power converter 40 shown in FIG. 1 includes three multilevel phase circuits 42, where the individual phase circuits 42 include multiple regenerative power stages 100 with respective power stage outputs 104 connected in series. As further shown in FIG. 2, the individual power stages 100 include an associated DC link circuit 130 with at least one capacitor C coupled between first and second DC link nodes 131 and 132, respectively. The individual power stages 100 also include a switching rectifier 120 with rectifier switching devices S1-S6 individually coupled between a respective one of the secondary circuits 34 and a respective one of the first and second DC link nodes 131 and 132, as well as a switching inverter 140 including inverter switching devices Q1-Q4 individually coupled between a respective one of the first and second DC link nodes 131, 132 and the respective power stage output 104. The use of the switching rectifier 120 facilitates regenerative operation of the system 10. The power stages 100 are provided for use as the power stages of single or multi-phase multilevel inverters 40. As shown in FIG. 2, the individual power stages 100 comprising a DC link circuit 130 a switching rectifier 120 coupled between a respective transformer secondary circuit 34 and the DC link circuit 130, and a switching inverter 140 coupled between the DC link circuit 130 and the respective power stage output 104.

Figure 3:
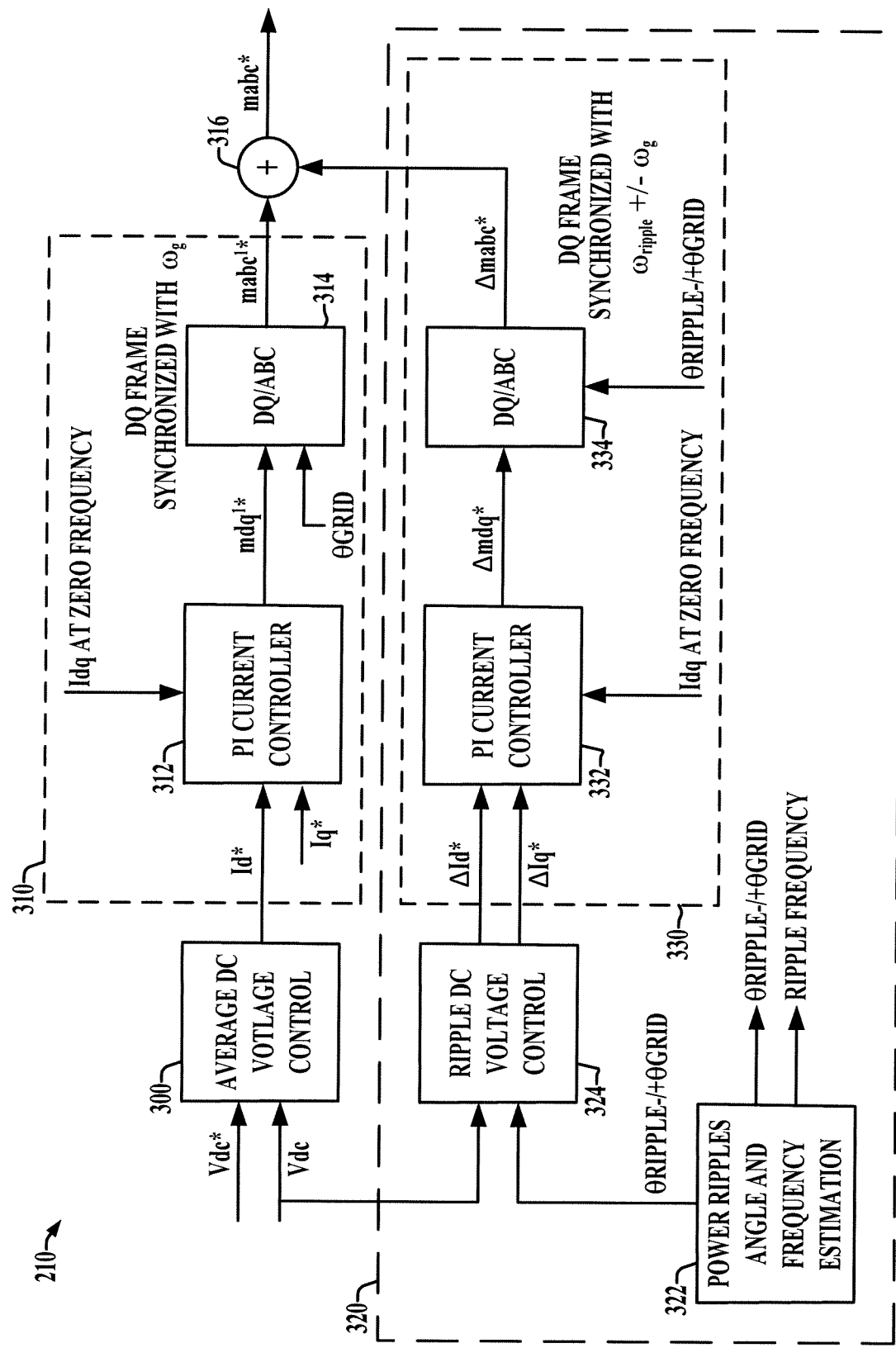
FIG. 3 is a schematic diagram.
Figure 4:
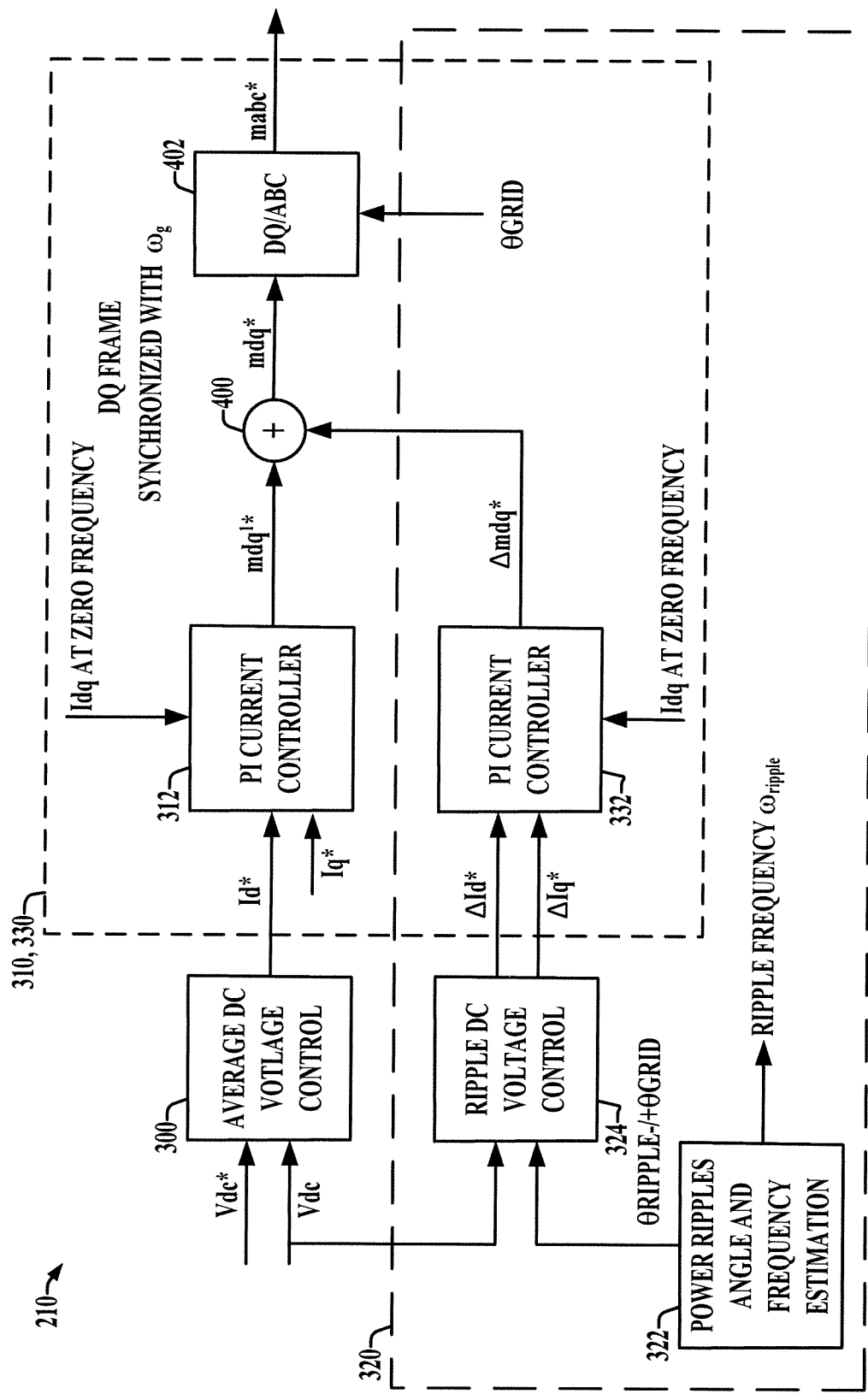
FIG. 4 is a schematic diagram.
Figure 5:
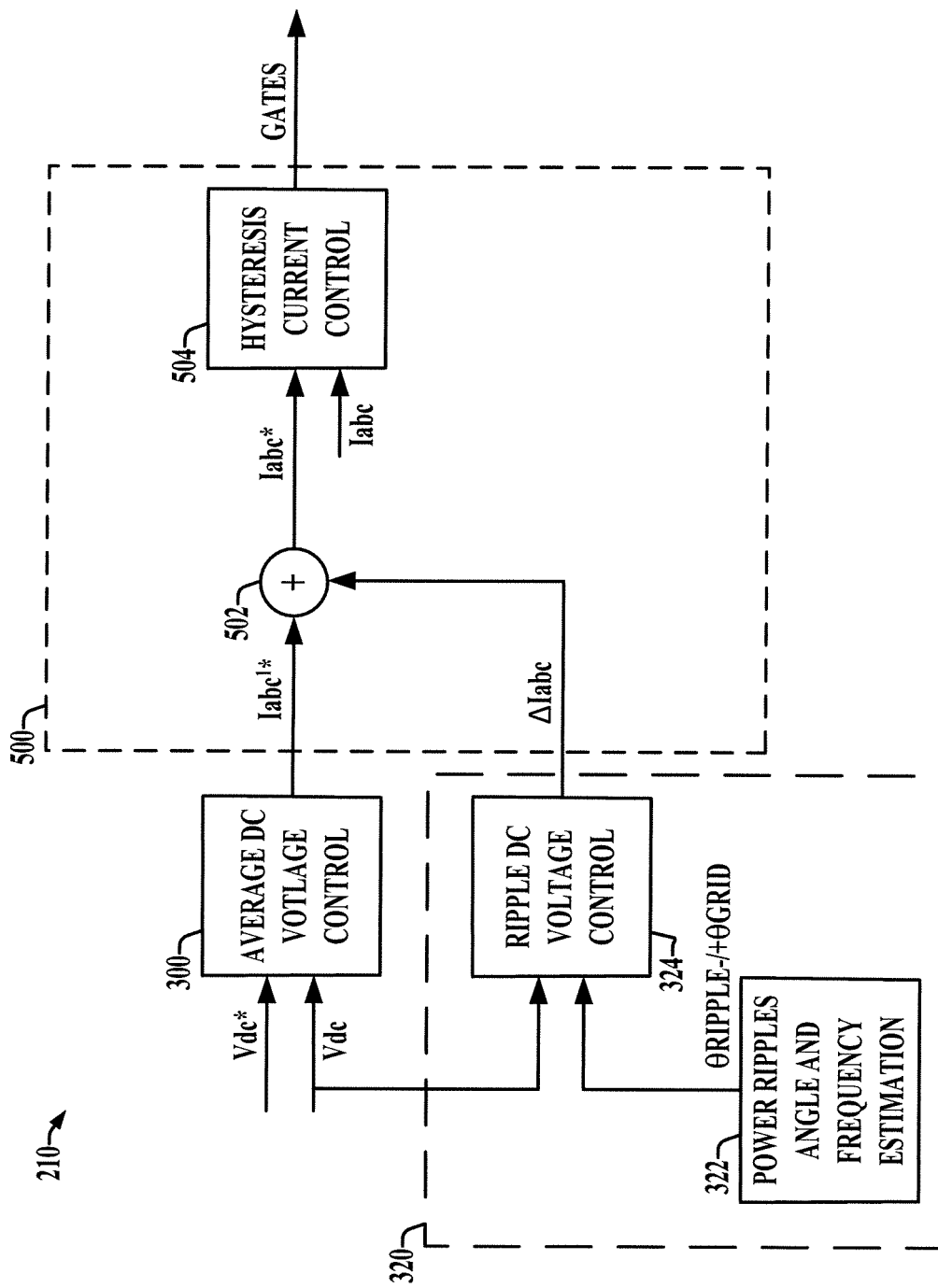
FIG. 5 is a schematic diagram.

Referring also to FIGS. 3-5, the controller 200, and the AFE controller 210 thereof, implement advanced ripple voltage control, which facilitates reducing and/or extending the useful lifetime of, the DC bus capacitor C in the DC link circuit 130. FIGS. 3-5 show three different example implementations of the AFE control circuit 210. In operation, the controller 220 generates a real average DC current reference Id* based on a DC bus voltage Vdc of the DC link circuit 130 and a DC bus voltage setpoint Vdc*, generates a reactive ripple current reference ΔIq* based on the DC bus voltage Vdc of the DC link circuit 130 and a ripple angle θripple of the DC link circuit 130, and generates rectifier switching control signals 212 to operate the rectifier switching devices S1-S6 based on the real average DC current reference Id* and the reactive ripple current reference ΔIq*. In this manner, the AFE controller 210 controls ripple voltage in the DC link circuit 130. In the examples of FIGS. 3-5, the AFE controller 210 also generates a real ripple current reference ΔId* based on the DC bus voltage Vdc and the ripple angle θripple, and generates the rectifier switching control signals 212 based on the real average DC current reference Id*, the real ripple current reference ΔId*, and the reactive ripple current reference ΔIq*.

The example of FIG. 3 includes an average voltage controller 300 that receives the DC bus voltage Vdc as a feedback signal or value, as well as a DC bus voltage setpoint Vdc*. The average voltage controller 300 generates a first d-axis current reference Id* (e.g., a real current reference representing d-axis current used for torque generation in the driven motor load 50 in FIG. 1). The first current reference Id* in this example is computed in a synchronous (e.g., d,q) reference frame. Limitations (e.g., FIGS. 3-5), the AFE ripple controller 210 performs various computations in a synchronous reference frame and/or a stationary reference frame. In one example, the processor 201 implements various 2-3 and 3-2 reference frame conversion components.

In the implementation of FIG. 3, the controller 210 performs various computational functions at 310 in the d,q synchronous reference frame, which is synchronized with a grid frequency $\omega_g$. The synchronous reference frame computations at 310 include implementing a first proportional-integral (PI) controller or control component 312 that receives the real average DC current reference Id*, as well as a q-axis current reference Iq* (e.g., equal to zero in one implementation). The first PI current controller 312 generates a first modulation index reference $mdq^{1*}$ for controlling the rectifier switching control signals 212, based on the real average DC current reference Id* (e.g., and on the q-axis current reference Iq* in certain implementations). In addition, the first PI current controller 312 generates the first modulation index reference $mdq^{1*}$ at least partially according to a zero frequency d,q current value Idq. In this example, the controller 210 also includes (e.g., implements) a first reference frame converter 314 (e/g/, DQ/ABC converter) that converts the first modulation index reference $mdq^{1*}$ from the d,q synchronous reference frame to generate a first stationary reference frame modulation index reference $mabc^{1*}$ in the a,b,c, stationary reference frame. The first stationary reference frame modulation index reference $mabc^{1*}$ is provided to a summer 316 that generates a final stationary reference frame modulation index mabc* used by the rectifier controller 210 to generate the rectifier switching control signals 212 in FIGS. 1 and 2.

The AFE controller 210 in FIG. 3 also includes or implements a ripple control component 320, with a power ripple angle and frequency estimation component 322 that provides phase angle and frequency estimates with respect to the ripple voltage signal of the DC link circuit 130 and the AC power (e.g., grid) received from the transformer secondary 34 and FIGS. 1 and 2. In this example, the estimation component 322 provides a ripple frequency output, as well as a phase angle output representing the ripple angle+/−the grid angle (e.g., θripple+/−θgrid). The controller 210 in this example also includes a ripple voltage controller 324 that generates a set of d and q axis (e.g., real and reactive) second current references ΔId* and ΔIq* based on the DC bus voltage Vdc of the DC link circuit 130 and the ripple angle θripple of the DC link circuit 130. The ripple control component 320 of the controller 210 in FIG. 3 also performs various computational functions for ripple injection/control at 330 in a d,q synchronous reference frame synchronized with the ripple frequency offset by the grid frequency $\omega_{ripple}+/-\omega_g$. This includes a second PI controller 332 that generates a second modulation index reference Δmdq* based on the real ripple current reference ΔId* and the reactive ripple current reference ΔIq*. In one example, the second PI controller 332 also operates according to the zero frequency d,q current value Idq. The controller 210 also includes (e.g., implements) a second reference frame converter 334 that converts the second modulation index reference Δmdq* from the d,q synchronous reference frame to generate a second stationary reference frame modulation index reference Δmabc* in the a,b,c stationary reference frame.

The summer 316 adds the second modulation index reference Δmdq* as an offset or supplement to the first modulation index reference mdq$^1$* to generate a final stationary reference frame modulation index mabc* in the a,b,c stationary reference frame. The rectifier controller 210 generates the rectifier switching control signals 212 in FIGS. 1 and 2 according to the final stationary reference frame modulation index mabc*, for example, using a pulse width modulation technique, such as carrier modulation for each AC input phase at the input of the rectifier 120. In this matter, example AFE controller 210 in FIG. 3 generates the rectifier switching control signals 212 based on the respective first and second modulation index references mdq$^1$* and Δmdq* (e.g., based on a sum of the first stationary reference frame modulation index reference mabc$^1$* and the second stationary reference frame modulation index reference Δmabc*). The AFE ripple controller 210 thus implements real and reactive ripple injection to reduce or mitigate ripple voltages in the DC link circuit 130. This control over the DC bus ripple voltage allows the use of smaller DC bus capacitance between the DC bus node 131 and 132 and/or enhances the service lifetime of the DC bus capacitor C. The example implementation of FIG. 3 can be advantageously employed for significant reduction in capacitor current ripple, together with improved Harmonic performance, but in practice these advantages may be limited to certain motor speed ranges (e.g., half speed range).

FIG. 4 shows another example implementation of the AFE ripple controller 210, including the components 300, 310, 312, 320, 322, 324 and 332 as and features as described above in connection with the implementation of FIG. 3. In this example, the offsetting is done with respect to d,q synchronous reference frame modulation index references for real and reactive ripple control injection. The controller 210 in FIG. 4 includes a summer 400 that receives the first modulation index reference mdq$^1$* from the first PI controller 312, as well as the second modulation index reference Δmdq* from the second PI controller 332, and adds these references to generate a combined modulation index reference mdq* based on a sum of the first modulation index reference mdq$^1$* and the second modulation index reference Δmdq*. The controller 210 in this example also includes a converter 402 that converts the combined modulation index reference mdq* from the d,q synchronous reference frame to the a,b,c stationary reference frame to generate a stationary reference frames modulation index reference mabc* in the stationary reference frame. The controller 210 generates the rectifier switching control signals 212 based on the stationary reference modulation index reference mabc*. The example ripple control implementation of FIG. 4 can be advantageously employed for significant reduction in capacitor current ripple and improved harmonic performance. This implementation can also achieve these improvements over a wider speed range than the implementation of FIG. 3. This example, however, may result in a more complex filtering structure for the line filter 110 in FIG. 2 above.

FIG. 5 shows another example implementation of the AFE controller 210. In this example, the controller 210 includes the average voltage controller 300 similar to that of FIG. 3 above. In FIG. 5, the average voltage controller 300 generates a first current reference Iabc$^1$* in the a,b,c stationary reference frame based on the DC bus voltage Vdc of the DC link circuit 130 and the DC bus voltage setpoint Vdc*. In addition, the controller 210 in FIG. 5 includes a ripple control component 320 as previously described, with the power ripple angle and frequency estimation component 322 that provides phase angle and frequency estimates with respect to the ripple voltage signal of the DC link circuit 130 and the AC power (e.g., grid) received from the transformer secondary 34 and FIGS. 1 and 2. In addition, the ripple control component 320 in FIG. 5 includes a ripple DC voltage control component 324 as described above, which generates a second current reference ΔIabc based on the DC bus voltage Vdc of the DC link circuit 130 and the ripple angle θripple of the DC link circuit 130. The controller 210 in this example also implements various computations at 500 in the stationary reference frame, including a summer 502 that generates a combined current reference Iabc* based on a sum of the first current reference Iabc$^1$* and the second current reference ΔIabc, as well as a hysteresis current controller 504 that generates the rectifier switching control signals 212 based on the combined current reference Iabc* and a current setpoint Iabc. The example ripple control implementation of FIG. 5 can be implemented to reduce capacitor current ripple over a wide motor speed range, as well as to improve Harmonic performance. Moreover, no current detection scheme is required, although the use of a hysteresis current controller may increase complexity.

In one implementation, a centralized controller 210 implements the ripple control concepts of the present disclosure for the individual power stages 100 of the regenerative multiphase multilevel regenerative power converter 10 in FIG. 1. In another implementation, each given power stage 100 of the multiple power stages 100 in the power converter 10 includes a corresponding controller 210 as described above, which generates the real average DC current reference Id* based on the DC bus voltage Vdc of the DC link circuit 130 and the corresponding DC bus voltage setpoint Vdc* for the given power stage 100, generates the reactive ripple current reference ΔIq* based on the DC bus voltage Vdc of the DC link circuit 130 and a ripple angle θripple of the DC link circuit 130 for the given power stage 100, as well as generates the corresponding rectifier switching control signals 212 based on the real average DC current reference Id* and the reactive ripple current reference ΔIq* for the given power stage 100.

Figure 6:
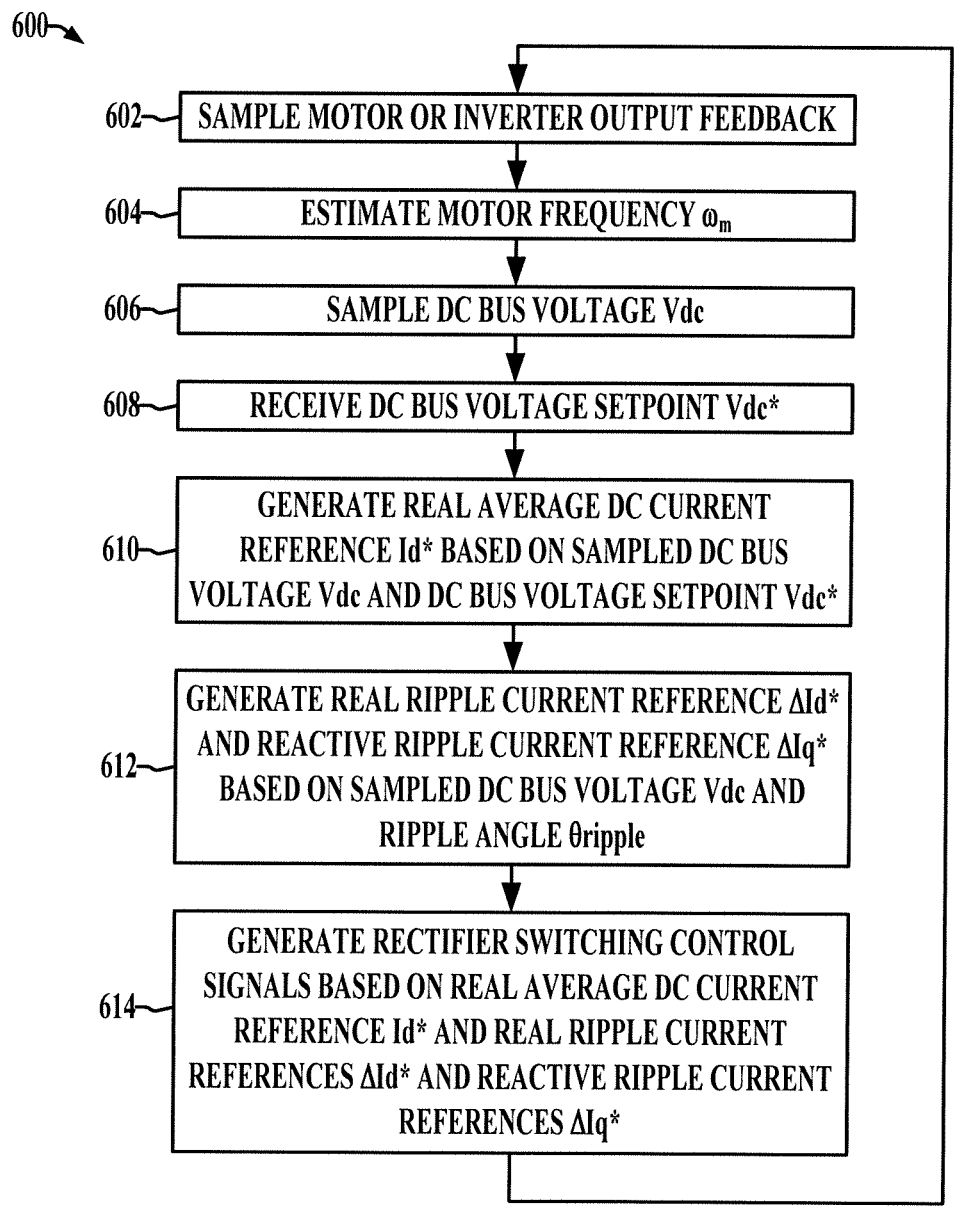
FIG. 6 is a flow diagram.

Referring also to FIG. 6, the examples of FIGS. 1-5 provide only several of many possible implementations in which real and reactive ripple current injection is used to control ripple currents and voltages in the DC link circuit. FIG. 6 shows an example method 604 operating an active front end rectifier, such as the AFE rectifier 120 described above. At 602, the method includes sampling motor or inverter output feedback. At 604, the motor frequency $\omega_m$ is estimated, and the DC bus voltage Vdc is sampled at 606. A DC bus voltage setpoint Vdc* is received at 608, for example, from the inverter control component 220 of the controller 200 in FIG. 2 above. At 610, a real average DC current reference Id* is generated, for example, based on a DC bus voltage Vdc of the DC link circuit 130 and a DC bus voltage setpoint Vdc*. At 612, a reactive ripple current reference ΔIq* is generated based on the DC bus voltage Vdc of the DC link circuit 130 and a ripple angle θripple of the DC link circuit 130, and at 614, rectifier switching control signals 212 are generated to operate the rectifier switching devices S1-S6, based on the real average DC current reference Id* and the reactive ripple current reference ΔIq*. The process 600 is then repeated for the next control cycle. In one example, the controller generates a real ripple current reference based on the DC bus voltage of the DC link circuit and the ripple angle, and generates the rectifier switching control signals based on the real average DC current reference, the real ripple current reference, and the reactive ripple current reference.

The disclosed ripple control techniques and control apparatus facilitate size reduction and lifetime extension of the DC link capacitor (C in FIG. 2). In this regard, the size of the DC bus capacitance impacts product performance, cost, size, weight, life expectancy, maintenance, and other aspects of a motor drive or other type power converter. In particular, DC bus ripple voltages and current ripple is a leading contributor to reduced capacitor life expectancy. Controlling ripple current facilitates reducing capacitor size/weight and/or increasing capacitor lifetime L, as shown in the following equation.

$$L = L_0 \cdot \frac{T_0 T_A}{10K} \cdot K_i \left(1 - \left(\frac{I_A}{I_R}\right)^2\right) \cdot \frac{\Delta T}{10K} \cdot \left(\frac{V_A}{V_R}\right)^{-n}$$

The disclosed controllers and techniques can be used to control the power flow through switching patterns on the AFE rectifier 120, so that the harmonics (e.g., $2^{nd}$ order ripple) in the DC link is reduced, to increase the lifetime of the DC-link capacitors. Harmonic analysis of the DC-link capacitor currents shows two dominate components at the second order component switching sidebands. These ripple currents cause self-heating of the capacitor C and may accelerate the aging of the DC bus capacitor. Of course, DC-link ripples could be reduced by adding more capacitance to DC-link, but this adds cost, weight, size, etc. to the power conversion system. In general, the capacitor ripple current $i_c$ depends on the motor frequency and power, and the instantaneous power phase angle and voltage ripple angle is approximately 90°. In addition, the instantaneous power $P_0$ is proportional to the load power and inversely proportional to load frequency, as shown in the following equations.

$$P_0 = v_0 i_0$$
$$= V_0 I_0 \sin(\omega_m t + \phi_1) \sin(\omega_m t + \phi_2)$$
$$= \frac{1}{2} V_0 I_0 \cos(\phi_2 - \phi_1) + \frac{1}{2} V_0 I_0 \cos(2\omega_m t + \phi_1 \phi_2)$$
$$= P_0 + \tilde{p}_0$$

$$u_c \approx U_{dc} + \frac{1}{2} \frac{|\tilde{p}_0| \sin(2\omega_m t + \phi_3)}{\omega_m C_d U_{dc}} = U_{dc} + \tilde{u}_c$$

$$i_c = C_d \frac{du_c}{dt} \approx \frac{|\tilde{p}_0| \cos(2w_m t + \phi_3)}{\omega_m U_{dc}}$$

Different AFE control schemes result in different DC link power flow. For example, where no pulsating power is injected, the required load ripple power is provided through the DC link capacitor C (Passive). For a system that injects pulsating real power, the required load ripple is fulfilled through the active front end. Certain implementations of the disclosed ripple control apparatus and techniques involve injecting pulsating real and reactive power. In this case, the required load ripple is fulfilled through the active front end AFE rectifier 120. In certain implementations where power is exchanged between the AFEs 120, the transformer secondaries 34, and the grid supply 20 (e.g., FIG. 1), transformer secondary currents may be distorted and have low order harmonics, possibly impacting transformer design/cost.

Certain implementations of the controller 210 inject one of two current components at frequency of $2\omega_m - \omega_g$ and $2\omega_m + \omega_g$ to control ripple in the DC link circuit 130. The following equation expresses the DC link current for injecting pulsating real power.

$$i_p^* = \frac{\tilde{p}_0}{|v^+|^2} v^+ = \frac{\frac{1}{2} V_0 I_0 \cos(2\omega_m t + \phi_1 \phi_2)}{|v^+|^2} v^+$$

$$\begin{bmatrix} i_{inja} \\ i_{injb} \\ i_{injc} \end{bmatrix} = \frac{\frac{1}{2} V_0 I_0 \cos(2\omega_m t + \phi_1 + \phi_2)}{|v^+|^2} \begin{pmatrix} \cos(\omega_g t + \theta_a) \\ \cos(\omega_g t + \theta_a - 120°) \\ \cos(\omega_g t + \theta_a + 120°) \end{pmatrix} =$$

$$\frac{V_0 I_0}{4|v^+|^2} \left( \begin{bmatrix} \cos(\omega_m t + \omega_g t + \theta_a + \phi_1 + \phi_2) \\ \cos(\omega_m t + \omega_g t + \theta_a - 120° + \phi_1 + \phi_2) \\ \cos(\omega_m t + \omega_g t + \theta_a + 120° + \phi_1 + \phi_2) \end{bmatrix} + \begin{bmatrix} \cos(\omega_m t - \omega_g t - \theta_a + \phi_1 + \phi_2) \\ \cos(\omega_m t - \omega_g t - \theta_a + 120° + \phi_1 + \phi_2) \\ \cos(\omega_m t - \omega_g t - \theta_a - 120° + \phi_1 + \phi_2) \end{bmatrix} \right)$$

In order to generate pulsating real and reactive powers, either a current at frequency of $2\omega_m - \omega_g$ or $2\omega_m + \omega_g$ is injected in certain implementations, as shown by the following equation for a DC link current setpoint value $i_p^*$.

$$i_p^* =$$
$$\frac{\tilde{p}_0}{|v^+|^2} v^+ + \frac{\tilde{q}_0}{|v^+|^2} v_\perp^+ = \frac{\frac{1}{2} V_0 I_0 \cos(2\omega_m t + \phi_1 \phi_2)}{|v^+|^2} \begin{bmatrix} \cos(\omega_g t + \theta_a) \\ \cos(w_g t + \theta_a - 120°) \\ \cos(\omega_g t + \theta_a + 120°) \end{bmatrix} +$$

$$\frac{\frac{1}{2} V_0 I_0 \sin(2\omega_g t + \phi_1 + \phi_2)}{|v^+|^2} \begin{bmatrix} \sin(\omega_g t + \theta_a) \\ \sin(\omega_g t + \theta_a - 120°) \\ \sin(\omega_g t + \theta_a + 120°) \end{bmatrix} =$$

$$\frac{V_0 I_0}{2|v^+|^2} \begin{bmatrix} \cos(2\omega_m t - \omega_g t - \theta_a + \phi_1 + \phi_2) \\ \cos(2\omega_m t - \omega_g t - \theta_a + 120° + \phi_1 + \phi_2) \\ \cos(2\omega_m t - \omega_g t - \theta_a - 120° + \phi_1 + \phi_2) \end{bmatrix}$$

For a 50 Hz motor frequency and injection of 100 Hz pulsating real power, without injecting reactive pulsating power, three current components can be controlled, but this results in complex current detection and control, as well as injection of high frequency current components and limited motor frequency range. Injection of both pulsating real and pulsating reactive power according to certain implementations of the controller 210 provides additional benefits. For example, with a 50 Hz motor frequency and injection of 100 Hz pulsating real power, reactive pulsating power can be injected (e.g., lagging or leading with respect to pulsating real power) to provide significant reduction in capacitor current ripple, as well as improved harmonic performance and improved current control, in addition to the capability to provide ripple control over a wider motor frequency range.

Certain examples of the AFE controller 210 inject both pulsating real and reactive powers. In one example, the controller 210 selectively controls the injected pulsating reactive power to be lagging or leading based on motor speed, for example, using one form of injection below a motor speed threshold, and the other form for motor speed above the threshold. The disclosed injection techniques for both pulsating real and reactive power improves harmonic performance of transformer secondary current and provides improved current control performance throughout a wide range of operation. In one example, the controller 210 employs decoupled current control loops, including a first control loop for fundamental frequency current component, and an additional control loop for the current component responsible for pulsating power injection. This provides improved steady state and dynamic performance of the current controller structure. In certain examples, the pulsating power setpoint is estimated, for example, based on the motor side controller references. In another example, the pulsating power setpoint can be estimated from the DC-link voltage measurement (e.g., where the pulsating angle and voltage ripple angle is 90 degrees). The use of setpoint estimation in certain implementations provides improved dynamic performance, and no additional sophisticated PLLs are needed on the motor side. In this regard, disclosed examples provide closed-loop control for ripple reduction based on at least one feedback signal or value, thereby providing improved dynamic performance at varying loading conditions.

Figure 7:
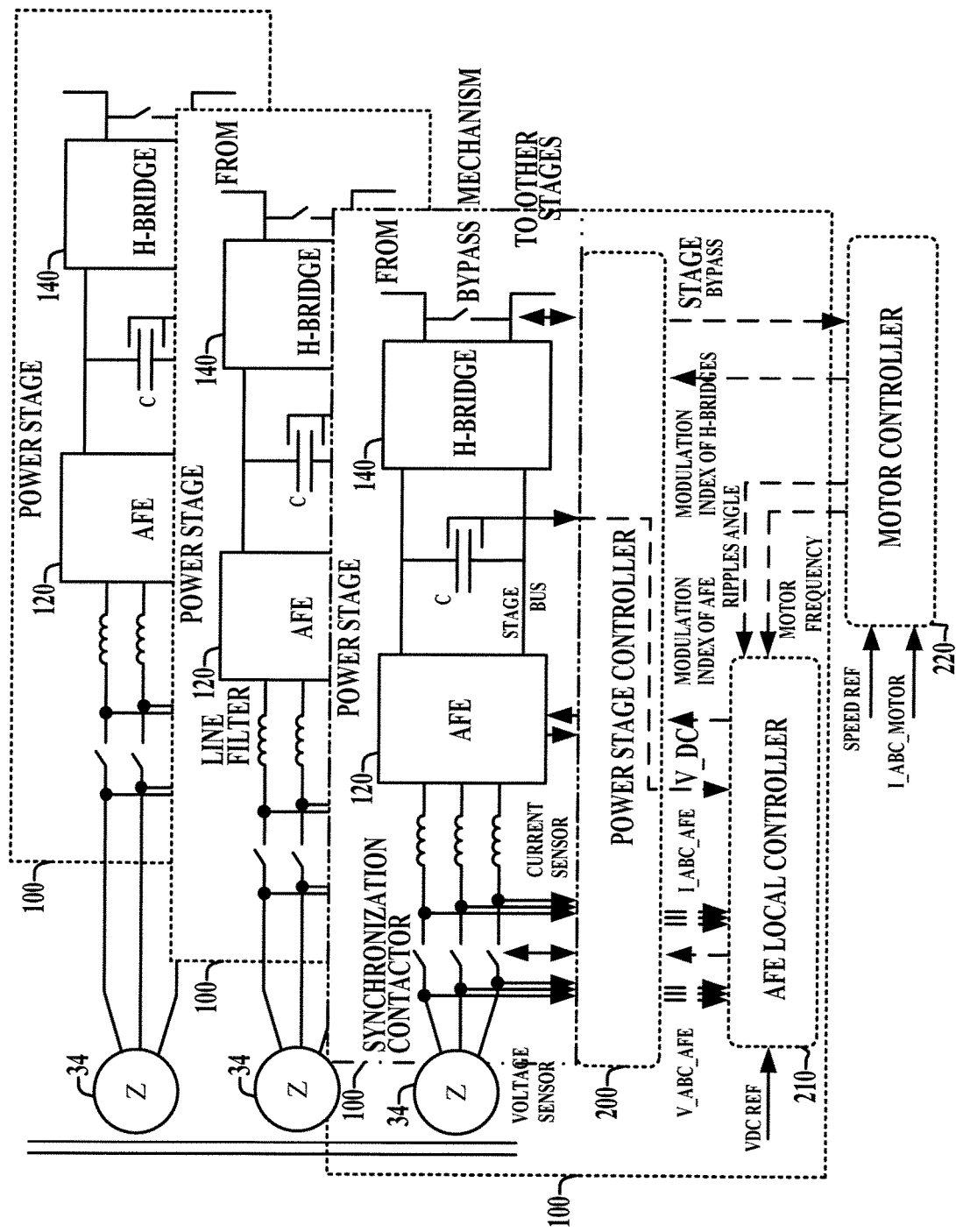
FIG. 7 is a schematic diagram.
Figure 14A:
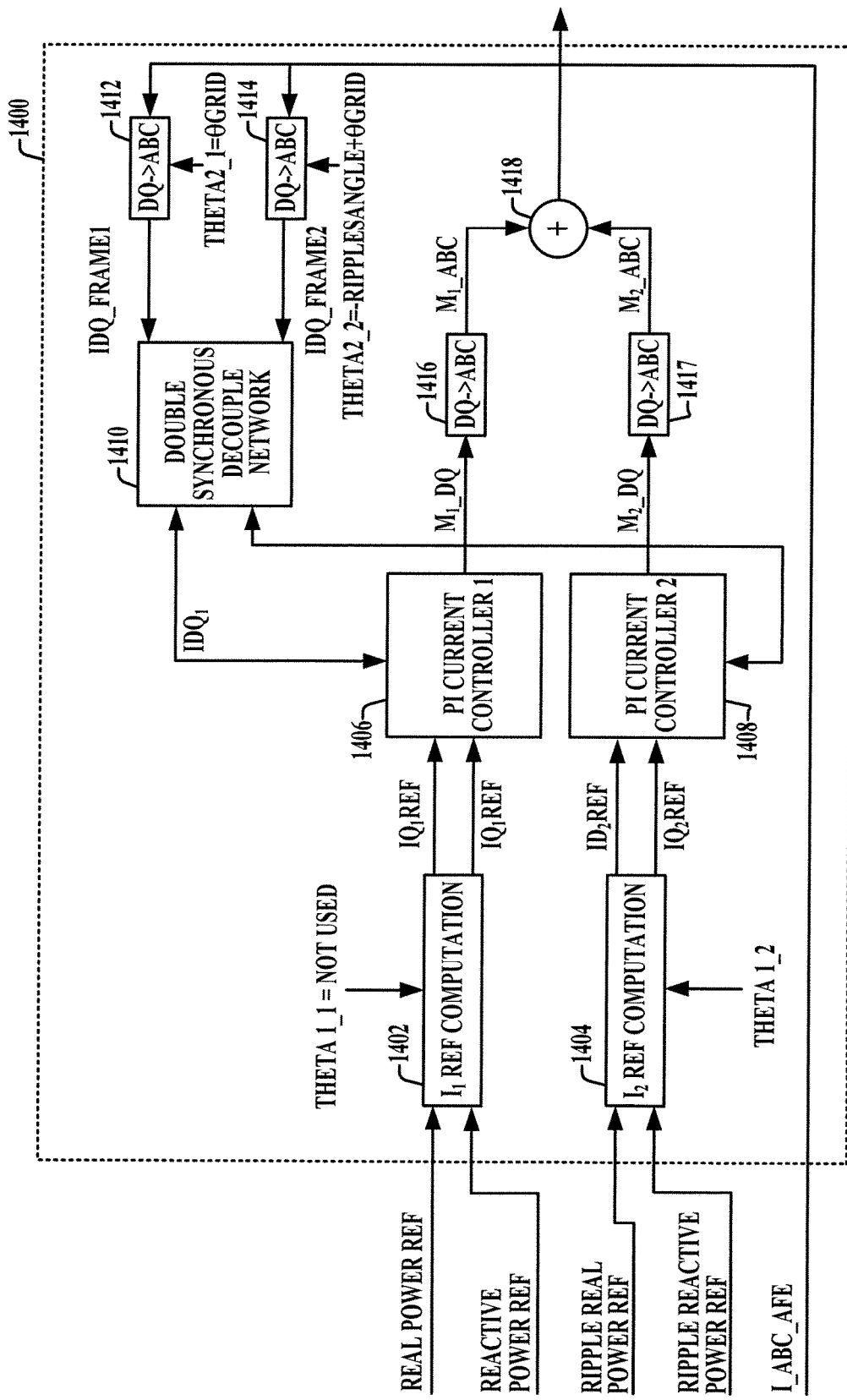
FIG. 14A is a schematic diagram.
Figure 14B:
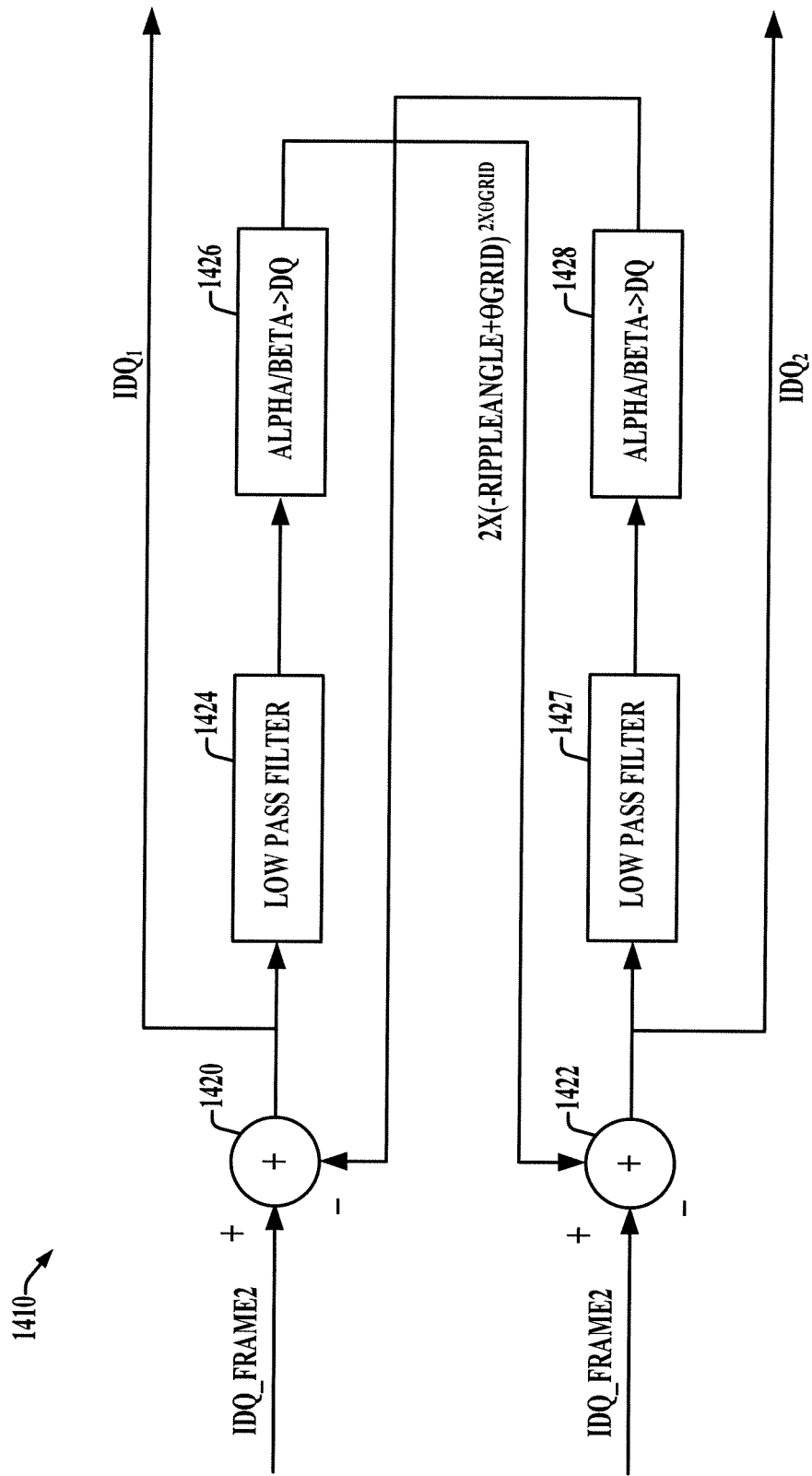
FIG. 14B is a schematic diagram.
Figure 14C:
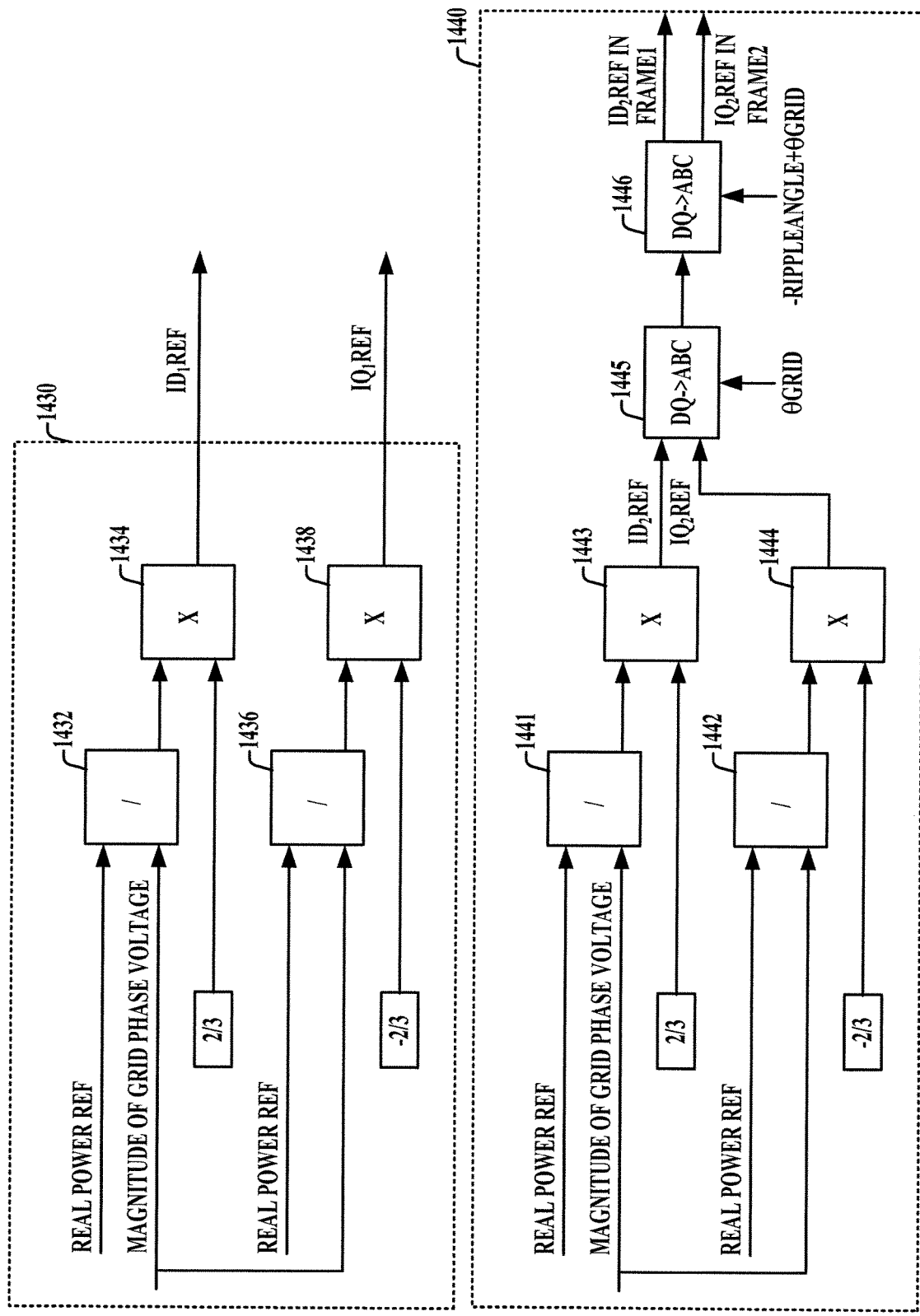
FIG. 14C is a schematic diagram.

FIG. 7 schematically shows an overall control system structure, including three example power stages 100 individually corresponding to one of the motor output phases, in which a local power stage controller (e.g., POWER STAGE CONTROLLER) 200 is shown for one of the example power stages 100, with a corresponding AFE local controller 210, and a global inverter (e.g., motor) controller 220. The local stage controller in this example is responsible for power switches gating, power stage monitoring, and protection. The AFE (active front end) controller 210 is a stage local controller that is responsible for autonomous control of the AFE 120. The main target of AFE local controller 210 is to regulate the DC bus average voltage Vdc. Adding to that core function, the AFE local controller 210 is responsible for regulating DC bus ripple. The inverter (e.g., motor) controller 220 and one example is a global controller that controls the motor side of the CHB drive as one unit, i.e. it coordinates the H-bridge switching circuits 140 of the associated power stages 100 in order to implement motor control. FIGS. 14A, 14B and 14C below show the detailed structure of one possible implementation of the global motor controller 220.

Figure 8A:
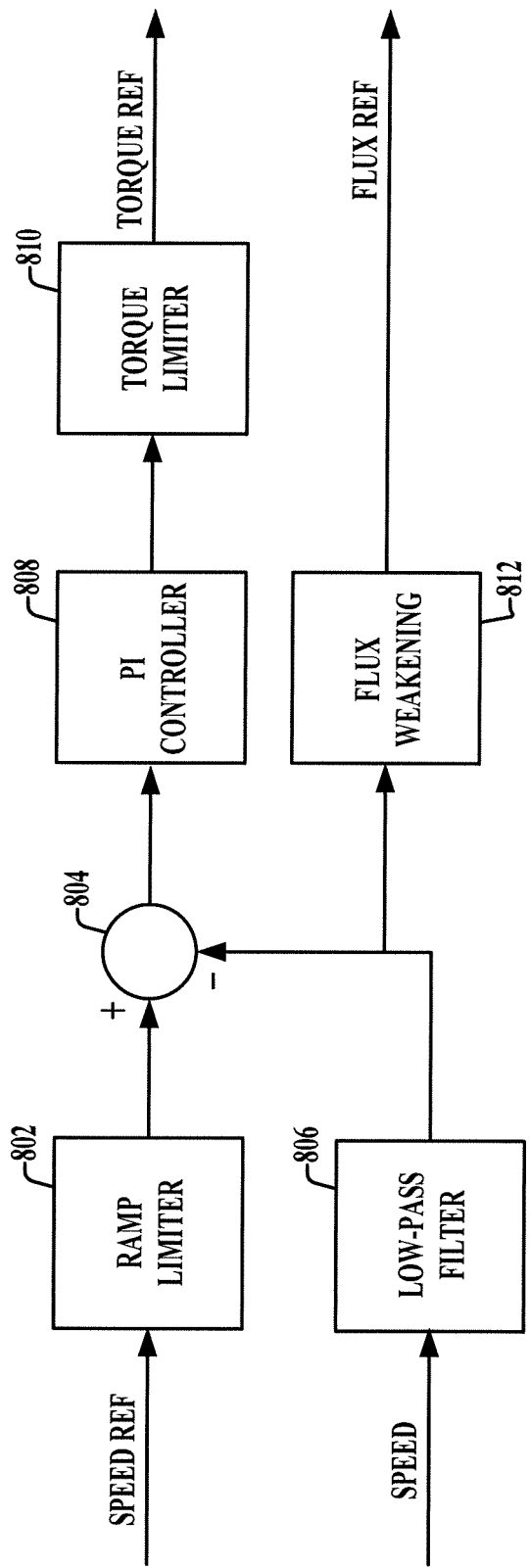
FIG. 8A is a schematic diagram.

FIG. 8A shows an example speed outer control loop in the motor controller 220, including a ramp limiter 802 that limits the ramp of a speed reference, and provides a first input (+) to a summer 804. The summer 804 subtracts the output of a low-pass filter 806 that filters a speed feedback signal that represents the motor speed. The output of the summer 804 is provided as an input to a PI controller 808, and the output of the low-pass filter 806 is provided as an input to a flux weakening component 812 that provides a flux reference output. The PI controller output is provided as an input to a torque limiter 810 that provides a torque reference. The illustrated outer speed loop in FIG. 8A provides the torque reference and the flux reference as inputs to enter control loops.

Figure 8B:
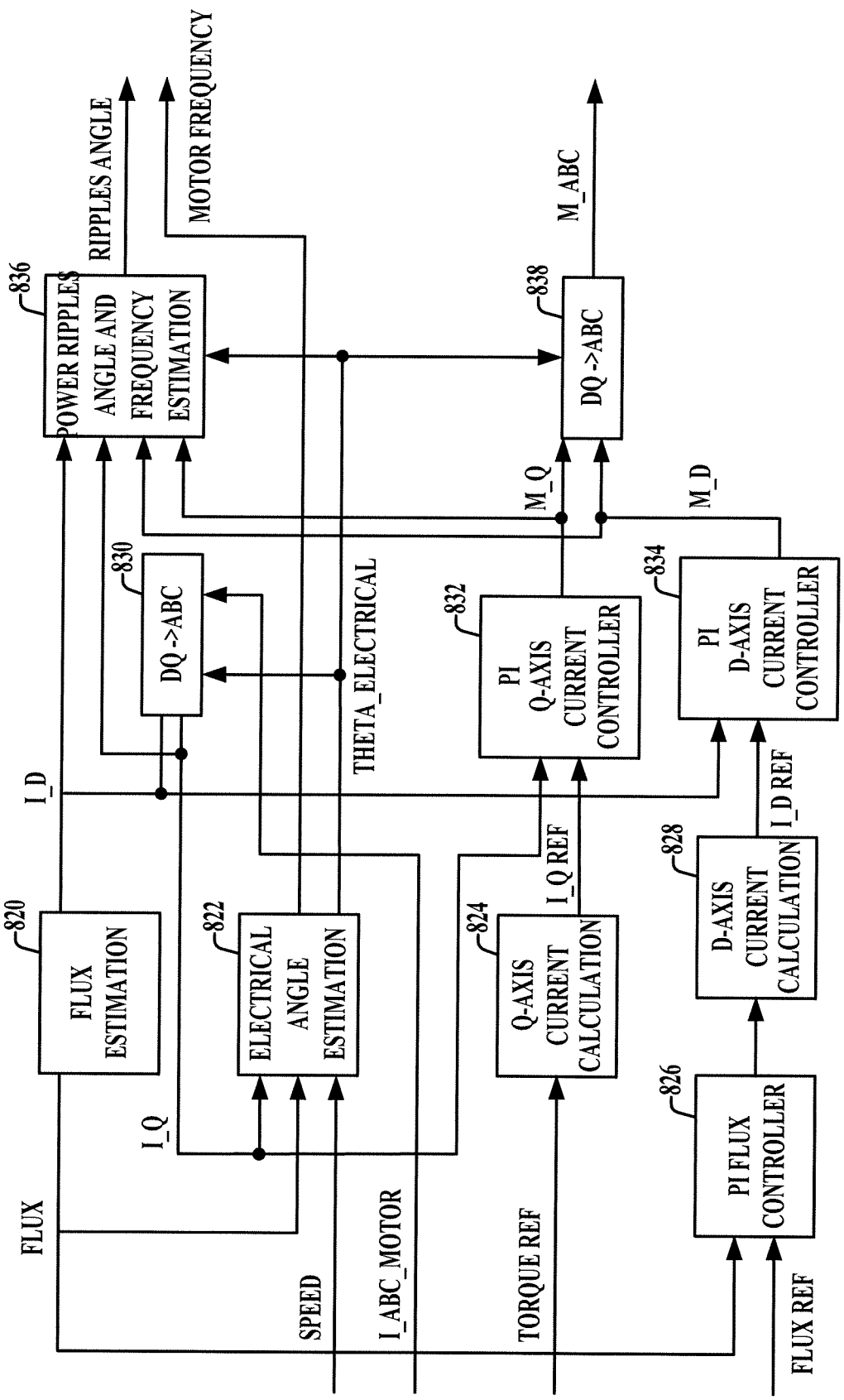
FIG. 8B is a schematic diagram.

FIG. 8B shows a detailed block diagram of an example field-oriented control (FOC) in addition to the power ripple angle estimation. Power ripple angle estimation in one example uses measured d and q-axes components of the drive output current, as well as computed d and q-axis components of the modulation indices (e.g., "m"), and the rotor flux orientation angle estimated in an electrical angle estimation block. The example in FIG. 8B includes a flux estimation component 820 that provides a flux value (FLUX) to an electrical angle estimation component 822. A q-axis current calculation component 824 receives a torque reference signal or value and provides a q-axis current reference output signal I_Q REF. A PI flux controller 826 receives the flux value from the flux estimation component 820, along with a flux reference signal or value, and provides a controller output to a d-axis current calculation component 828. The field-oriented control component in FIG. 8B further includes a synchronous to stationary reference converter component 830 that receives an electrical angle signal or value (THETA_ELECTRICAL) and a stationary reference frame motor current feedback signal or value (I_ABC_MOTOR), and provides a d-axis current value I_D. A q-axis PI current controller 832 receives a q-axis current value I_Q from the conversion component 830, as well as the q-axis current reference output signal I_Q REF from the calculation component 824, and provides a q-axis modulation index signal or value M_Q. A d-axis PI current controller 834 receives the d-axis current value I_D and a d-axis current reference signal or value I_D REF from the calculation component 828, and provides a d-axis modulation index signal or value M_D. A power ripples angle estimation component 836 (e.g., 326 in FIG. 3 above) provides the ripples angle output signal. A second synchronous to stationary reference converter component 838 receives the electrical angle signal or value (THETA_ELECTRICAL), as well as the d and q-axis modulation index signals or values and provides a stationary reference frame modulation index signal or value M_ABC.

Figure 8C:
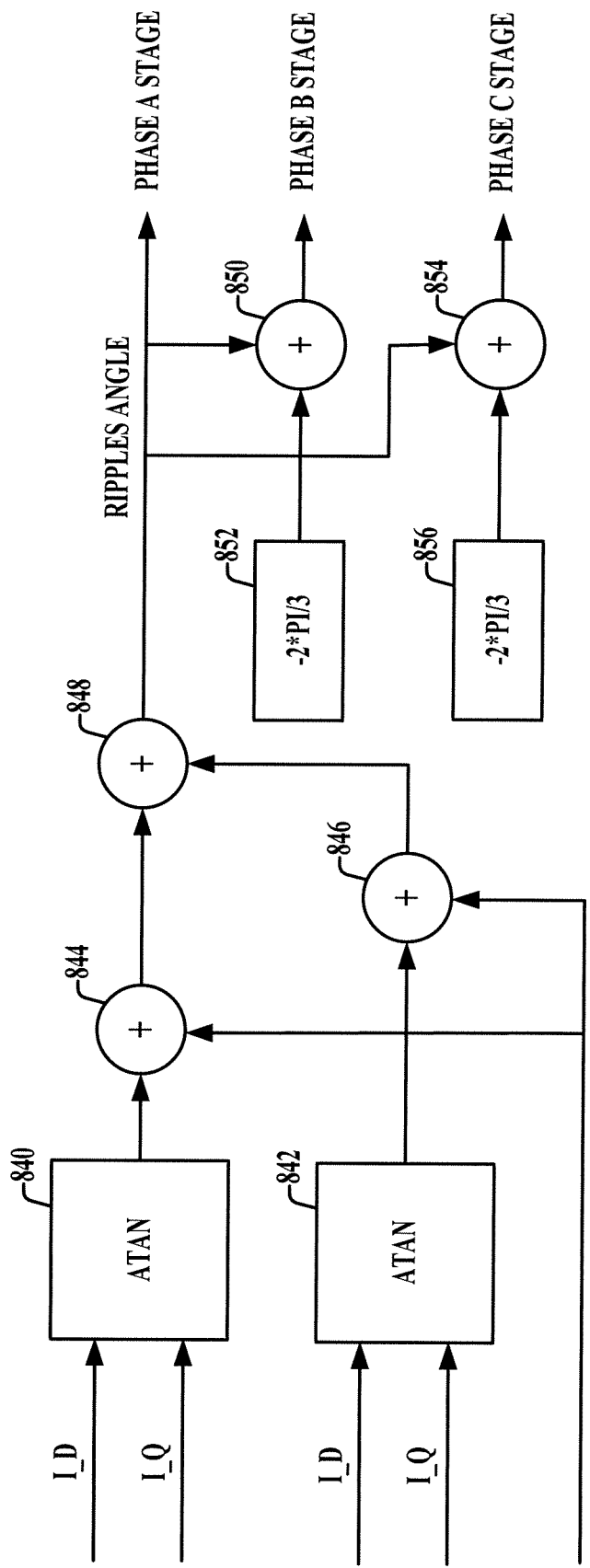
FIG. 8C is a schematic diagram.

FIG. 8C shows the details of an example power ripple angles estimation implementation, including arctangent functions 840 and 842, summers 844, 846 and 848, as well as summers 850 and 854, along with predetermined values 852 and 856. After estimation, the power ripples angle and motor frequency are sent from the motor controller 220 to the local controller 210 of each AFE 120 as shown in FIG. 7.

Figure 9:
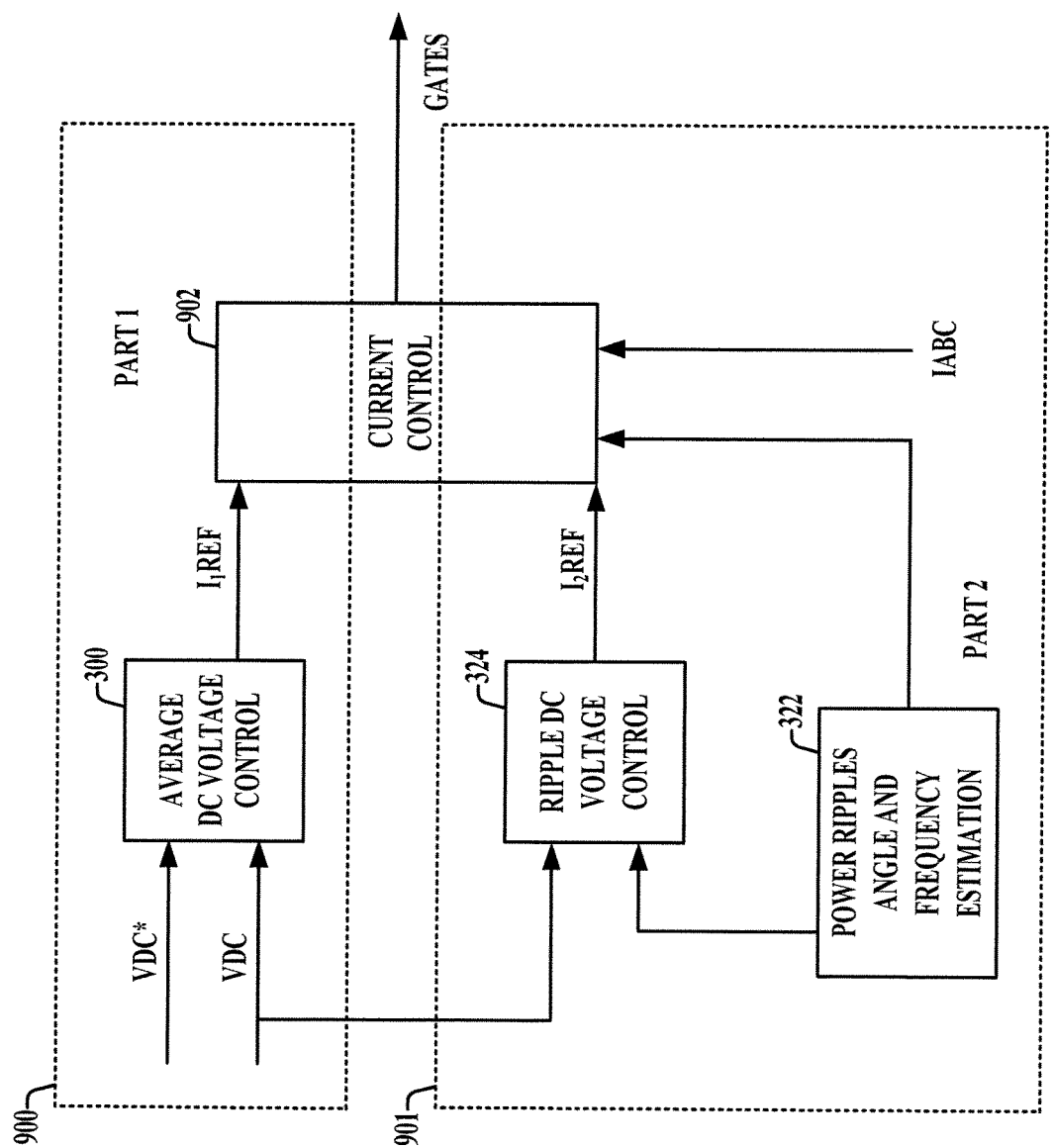
FIG. 9 is a schematic diagram.

FIG. 9 shows an example implementation of an AFE local controller 210, including a first part 900 with the average DC voltage controller 300, as well as a second part 901 that includes the power ripples angle and frequency estimation component 322 and the ripple DC voltage control component 324 as described above. The average DC voltage control component 300 provides a first reference $I_1$REF to a current control component 902, and the ripple DC voltage control component 324 provides a second current reference $I_2$REF to the current control component 902. The first part 900 and FIG. 9 regulates the DC bus average voltage according to $I_1$REF, while the second part 901 regulates the DC bus ripple voltage according to $I_2$REF. This example provides advantages of decoupled control of the average DC bus voltage Vdc according to $I_1$REF and ripple voltage according to $I_2$REF.

Figure 10:
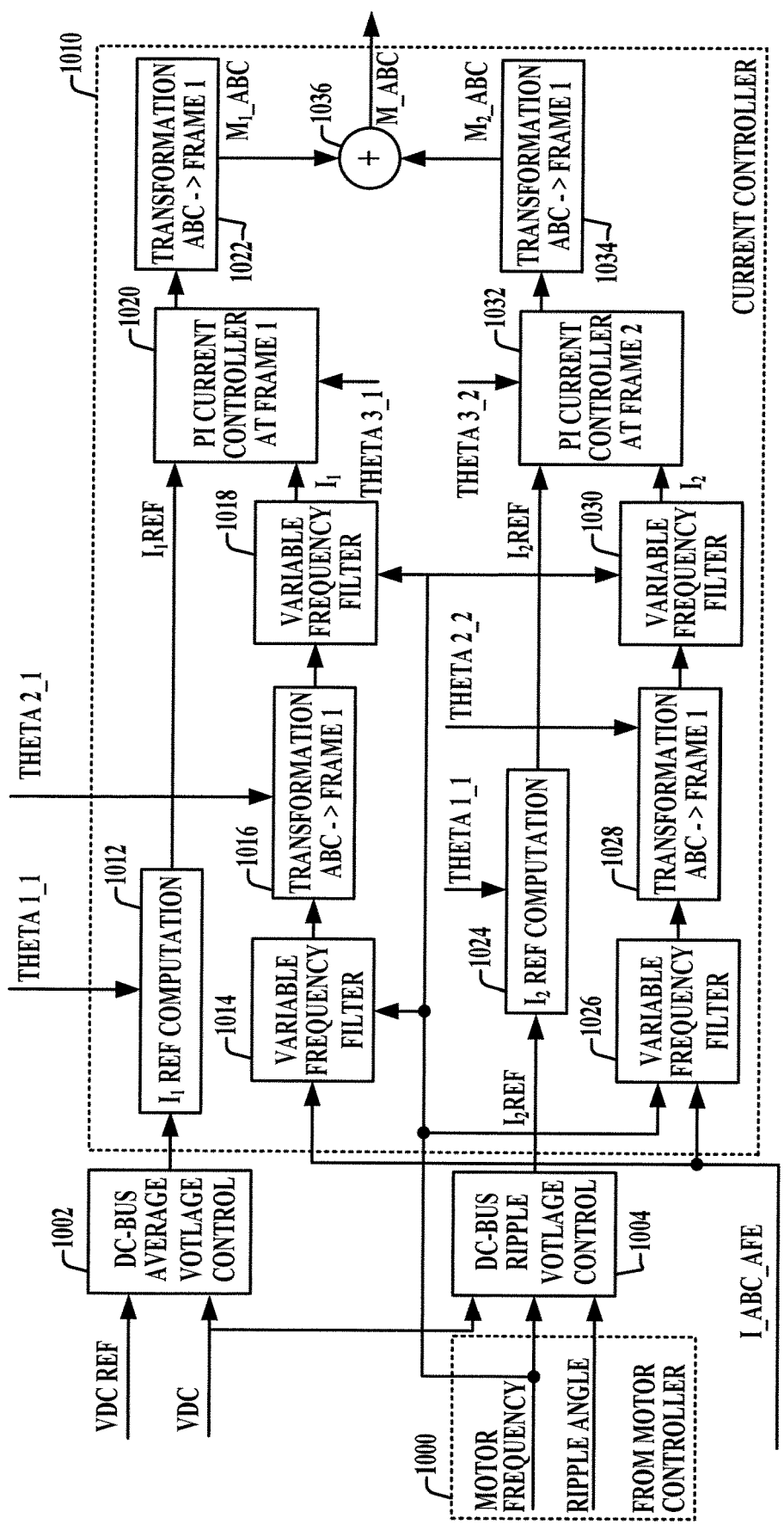
FIG. 10 is a schematic diagram.

FIG. 10 shows an example implementation of the AFE controller 210, including feedback values 1000 from the motor controller 220, as well as a DC bus average voltage control component 1002 and a DC bus ripple voltage control component 1004. A current controller 1010 includes a first reference current computation component 1012, a variable frequency filter 1014 that provides an output to a transformation component 1016. The component 1016 provides an output to a variable frequency filter component 1018, that provides a first current reference to a first PI current controller 1020. The PI controller 1020 provides an output to a transformation component 1022 that provides a first modulation index output to a summer 1036. The current controller 1010 in FIG. 10 also includes a second current reference computation component 1024, as well as a variable frequency filter 1026 that provides an output to a transformation component 1028. The output of the transformation component 1028 provides an input to a variable frequency filter 1030, which outputs a second current estimate to a second PI controller 1032. The output of the second PI controller 1032 is provided to a transformation component 1034 that provides a modulation index signal or value to the summer 1036. The summer 1036 provides the combined modulation index signal or value to generate the rectifier switching control signals 212 in FIG. 2 above.

Figure 11:
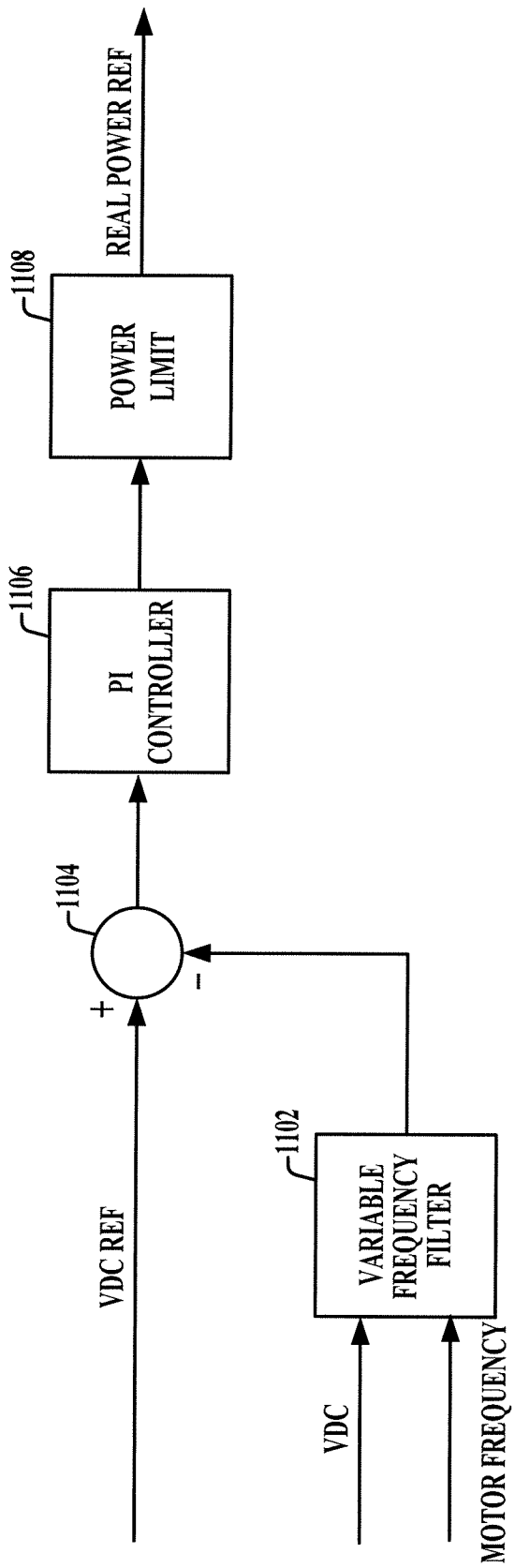
FIG. 11 is a schematic diagram.

FIG. 11 shows details of an example implementation of a DC bus average voltage controller. This example includes a variable frequency filter 1102 that filters the DC bus voltage and the motor frequency and provides an input (−) to a summer 1104. A positive input (+) to the summer 1104 receives the DC bus voltage reference signal or value, and the summer 1104 provides an input to a PI controller 1106. The output of the controller 1106 is provided to a power limit component 1108, and the component 1108 provides a real power reference output. This example includes the variable frequency low pass filter component 1102 that mitigates or prevents DC bus ripples from going into the controller.

Figure 12A:
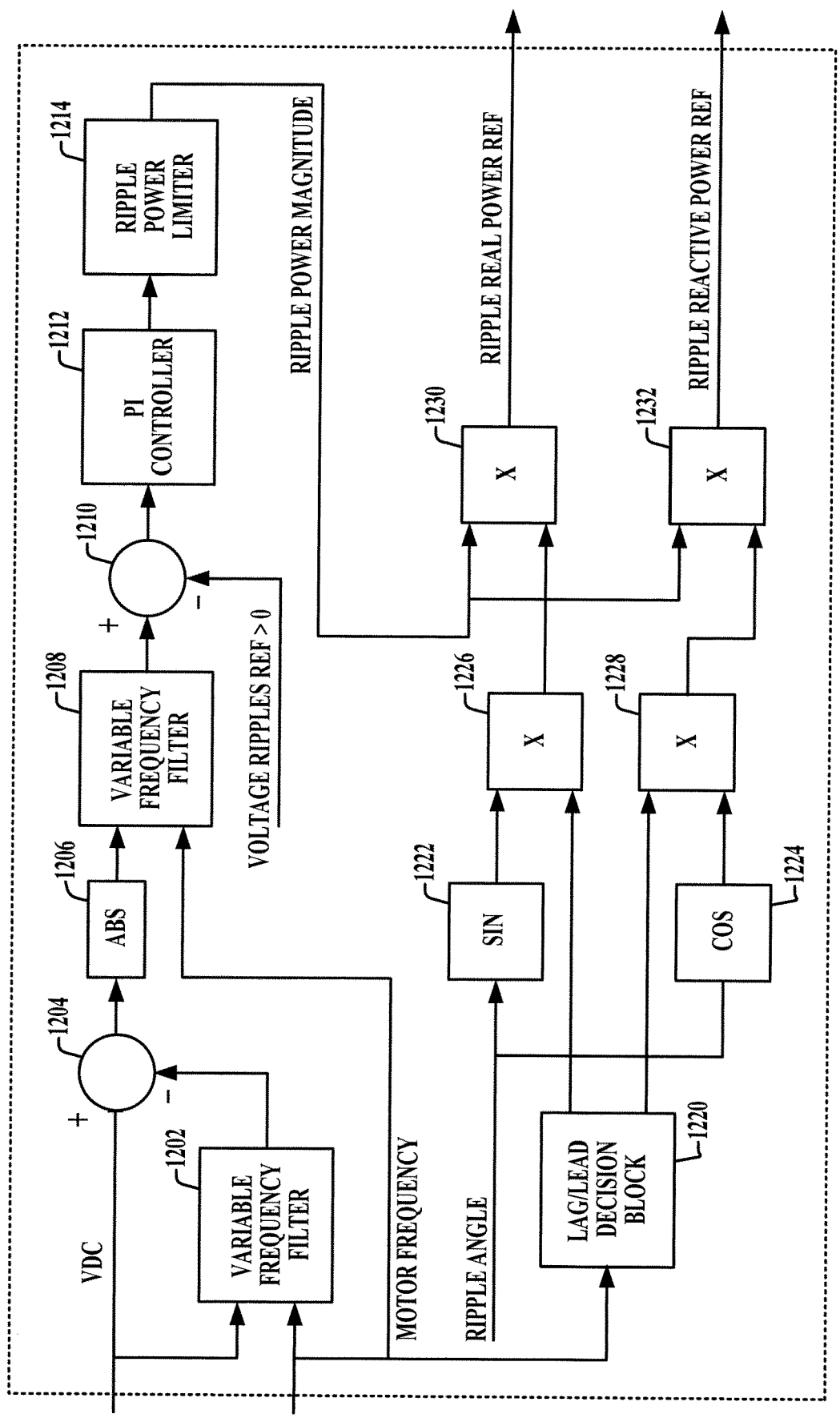
FIG. 12A is a schematic diagram.
Figure 12B:
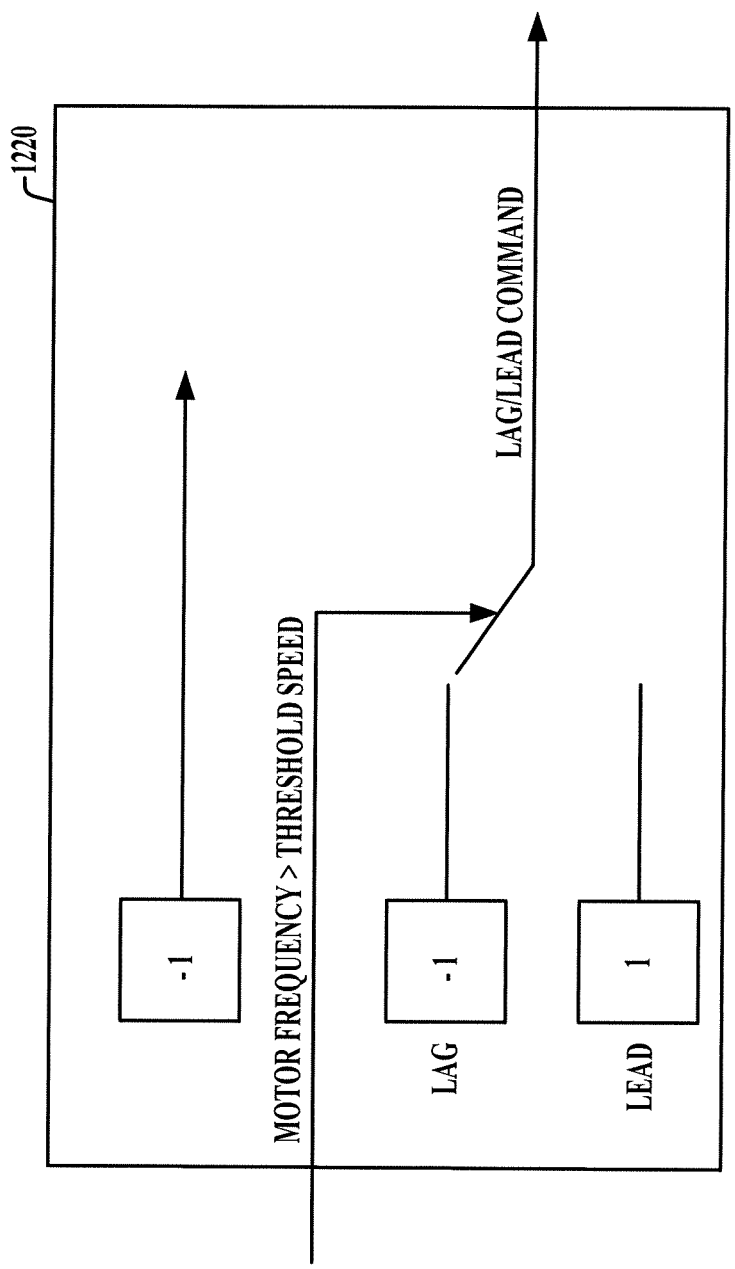
FIG. 12B is a schematic diagram.

FIGS. 12A and 12B 12 show an example implementation of the controller 210 that implements selective use of leading or lagging relationship according to motor speed. This example includes a variable frequency filter 1202 with an output subtracted by a summer 1204 from the DC bus voltage signal or value, and an absolute value block 1206 provides the absolute value of the summer output to a first input of a variable frequency filter component 1208. The motor frequency signal or value (e.g., feedback measure value or estimated value) is provided as a second input to the variable frequency filter 1208. A summer 1210 receives the output of the variable frequency filter 1208 and subtracts a voltage ripples reference to provide an input to a PI controller 1212. The output from the controller 1212 is provided to a ripple power limiter component 1214. This example also includes a lag/lead decision block 1220, a sine component 1222 and a cosine component 1224. The components 1220, 1222 and 1224 provide inputs to multiplier blocks 1226 and 1228. Further multiplier blocks 1230 and 1232 multiply the respective outputs from the multiplier blocks 1226 and 1228 by the ripple power magnitude output from the ripple power limiter component 1214, and respectively provide ripple real power reference and ripple reactive power reference signals or values. This implementation reduces or minimizes the average of the absolute value of the difference of the measured DC bus voltage including the ripples and its average after excluding the ripples by injecting real and reactive power synchronized with power ripple angle estimated from motor controller. The reactive power component can be chosen as lagging or leading based on the motor frequency, for example, lagging for load frequencies of 35 Hz or above, and leading for load frequencies below 35 Hz, which may be implemented by the lag/lead decision block 1220 in FIG. 12A. The output of the controller in FIG. 12A includes the real and reactive ripple power references synchronized with the ripple power angle estimated in the motor controller 220. These two outputs are then fed into the current controller. FIG. 12A presents the details of the DC bus ripples control, while FIG. 12B shows the details of Lag/Lead decision block, including a logical switch that provides a lag/lead command output (e.g., the two outputs from the decision block 1220 and FIG. 12A) based on a comparison of the motor frequency with a threshold speed.

Figure 13:
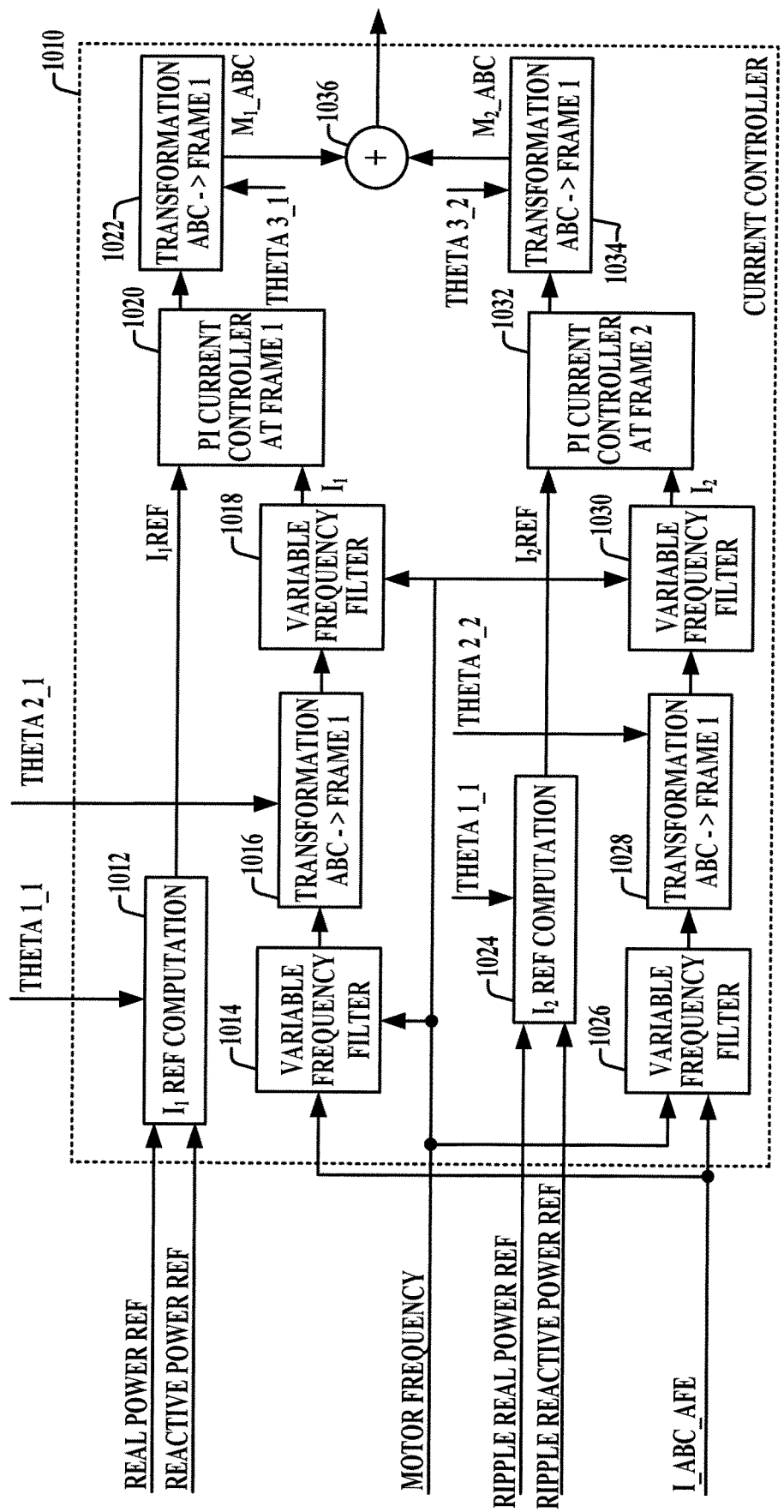
FIG. 13 is a schematic diagram.

Referring to FIGS. 13-14C, FIG. 13 shows an example generic current controller portion 1010 of the controller in FIG. 10 above. FIG. 14A shows an example implementation of a first current controller 1400 (Current Controller 1), which shows one approach for injecting ripple power into the supply. This example includes a first reference current computation component 1402 with an associated first PI current controller 1406, as well as a second current reference computation component 1404 and an associated PI current controller 1408. This example first controller 1400 also includes a double synchronous decouple network 1410 (e.g., details shown in FIG. 14B), reference frame conversion components 1412, 1414, 1416 and 1417, as well as a final modulation index summer 1418. In this control structure, the two current components control the DC bus average voltages and DC bus ripple voltage use two current controllers 1406 and 1408 in two different rotating frames. One frame is synchronized with the grid and the other frame is synchronized either to double motor frequency minus the grid frequency or double motor frequency plus grid frequency.

In order to decouple the two current components for control purposes, the double synchronous decouple network 1410 in FIG. 14B uses Summers 1420 and 1422, as well as low-pass filters 1424 and 1427 with fixed cutting frequencies, along with reference frame conversion components 1426 and 1428. The example decoupling network 1410 in FIG. 14B is simpler than the variable frequency structure presented in the generic current controller structure shown in FIG. 16. However, this decoupling network 1410 limits the allowed motor frequency range from 40 Hz to 60 Hz in one example, in order to mitigate or avoid interaction between controller dynamics of filtration bandwidth.

FIG. 14C shows an example implementation that computes the first and second current references I1 and I2. This example includes a first component 1430 with dividers 1432 and 1436 as well as multiplier components 1434 and 1438. The example of FIG. 14C also includes a second component 1440 with dividers 1441 and 1442, multiplier 1443 and 1444, and conversion components 1445 and 1446. Real and reactive power references are DC values in this example, which produce Id1 and Iq1 references as DC values that are supplied to current controller 1 operating in the grid frame of reference. On the other side, ripple real and reactive power references are sinusoids with double the motor frequency synchronized with the motor controller. The references are then transformed to the stationary reference frame using the grid angle, and thereafter are transformed to a synchronous rotating frame that rotates synchronous to the grid angle minus the ripple angle estimated by the motor controller 220. By that step, the reference currents id2 and iq2 are computed in the second frame (frame2) so that they can be regulated by current controller 2 which operates in rotating frame 2.

For a measured current I_abc, that contains two current components I1 and I2, a first component is rotating at the same speed and direction of the grid and the other is rotating in negative direction of that of the grid with variable speed. The filtration process separates the two components and transforms them so that each component appears as a DC value in its respective controller. The first component only shows up to controller 1, and the second component only shows to controller 2. This target is achieved through the double synchronous decouple network 1410 of FIG. 14B for the higher motor speed range of 40 to 60 Hz, and expanded speed ranges could be achieved, for example, by providing more complex filter and transformation structures (not shown). The first controller provides significant reduction in capacitor current ripple, improved harmonic performance, improved current component detection, but these advantages are cheap by providing control in two different reference frames and limited allowable motor speed range because of possible restrictions and the ability of a double synchronous network to function at low motor speeds.

Figure 15A:
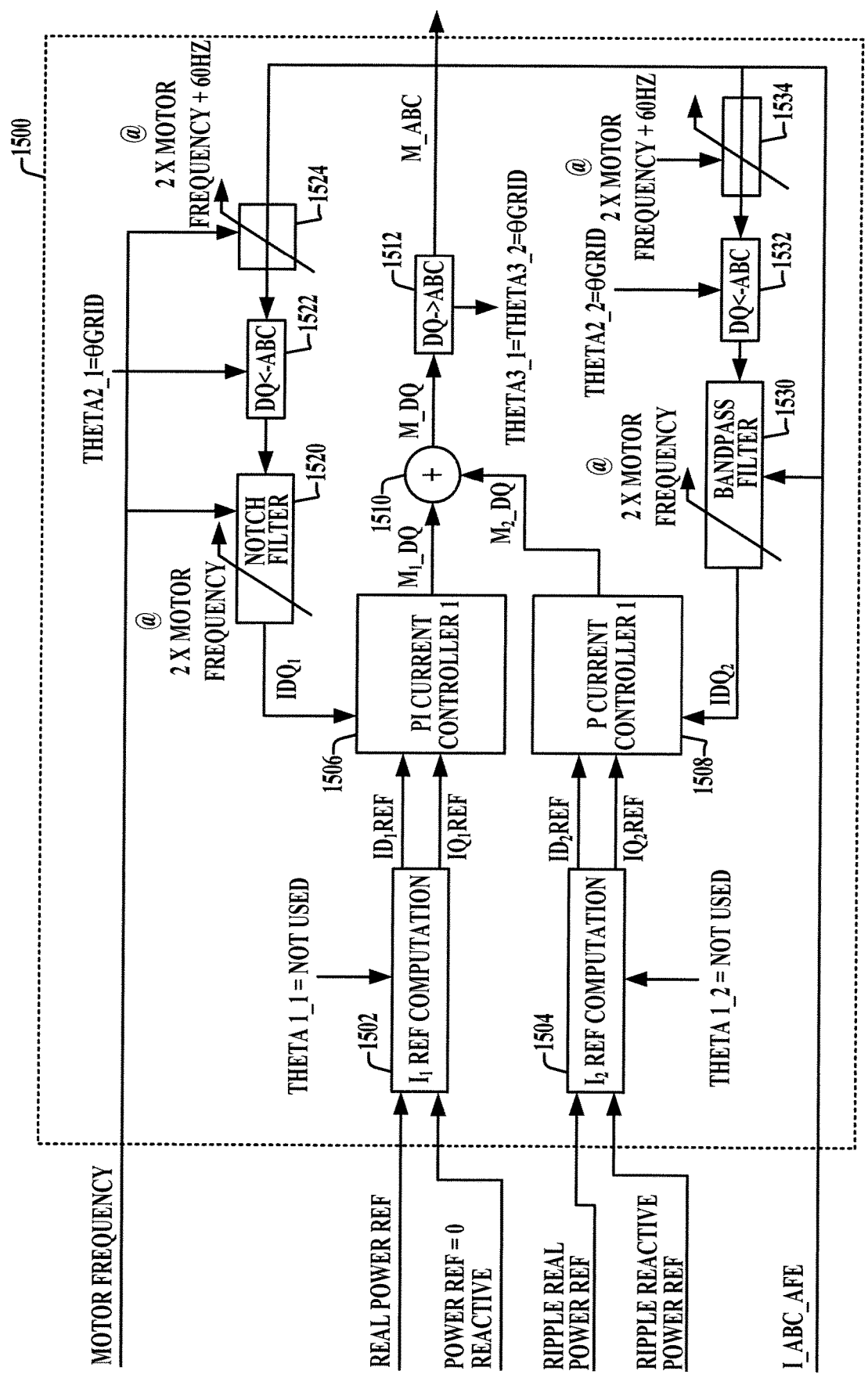
FIG. 15A is a schematic diagram.
Figure 15B:
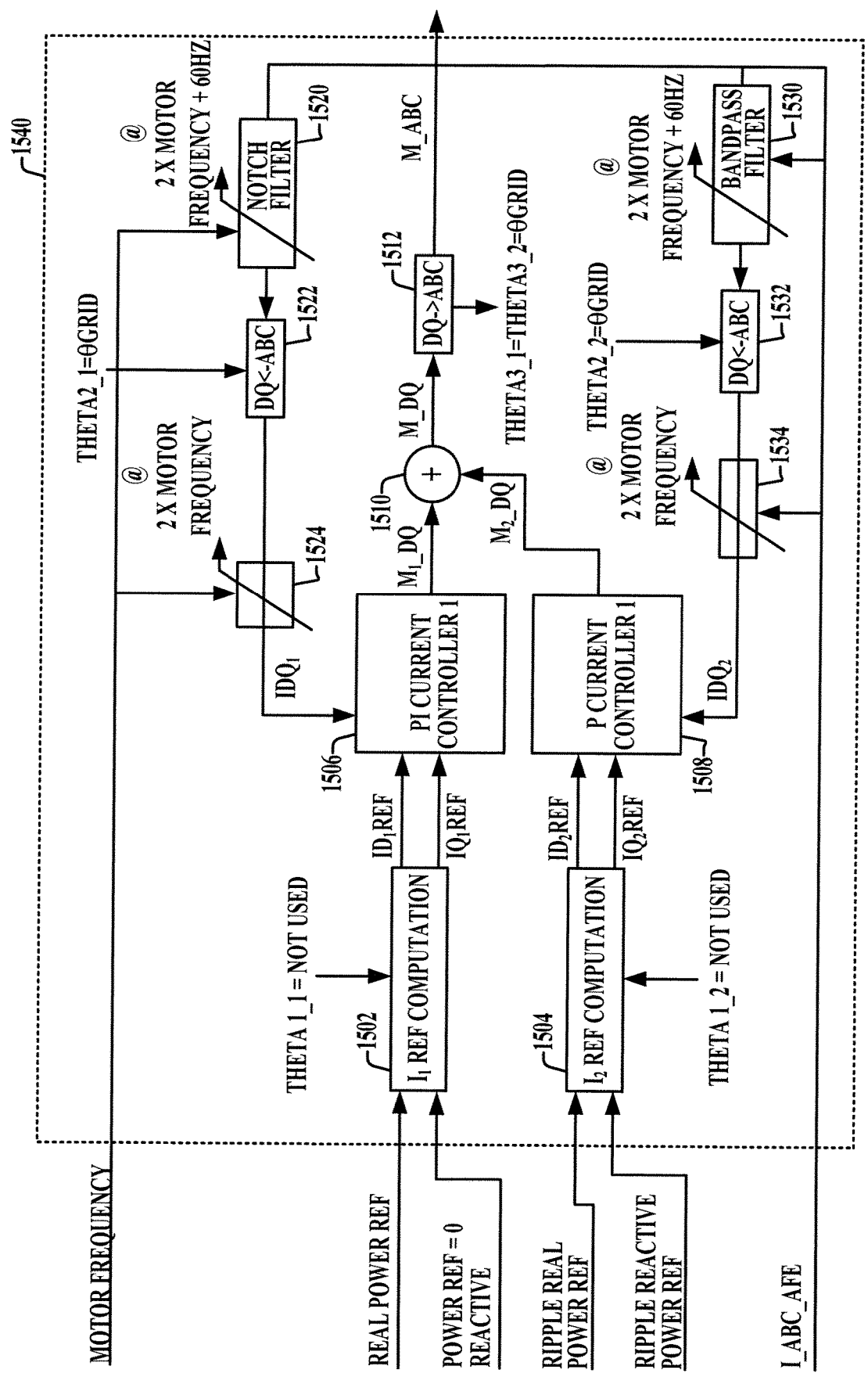
FIG. 15B is a schematic diagram.
Figure 15C:
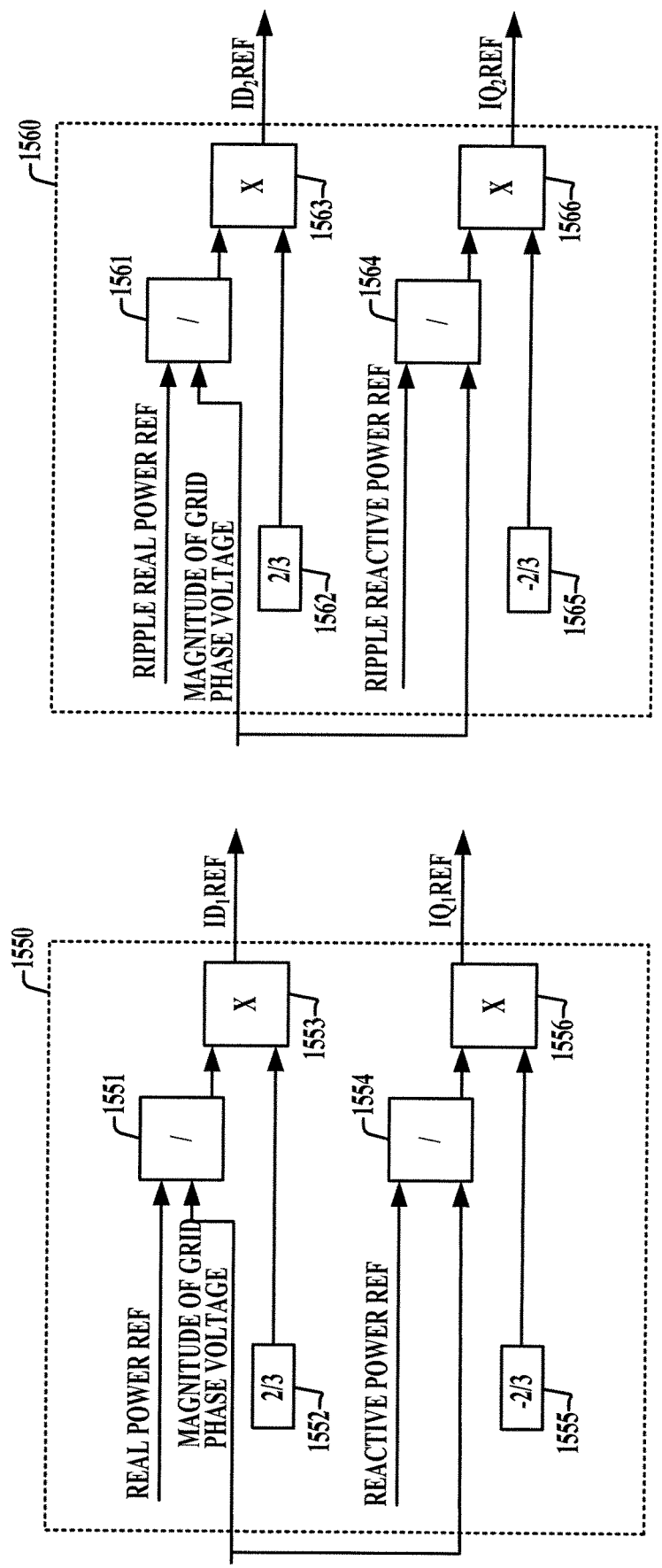
FIG. 15C is a schematic diagram.

Referring also to FIGS. 15A-15C, the generic current controller structure of FIG. 13 includes a second controller (e.g., 1322), as further shown in FIG. 15A. The examples of FIGS. 15A-15C provide one possible implementation for the second controller implementation illustrated and described above in connection with FIG. 4. FIG. 15A shows the detailed implementation 1500 of the current controller 2 at motor frequencies above 35 Hz, and FIG. 15B shows an implementation 1540 of the controller 2 at motor frequencies below 35 Hz. These implementations include first and second reference computation components 1502 and 1504, first and second PI controllers 1506 and 1508, a summer 1510 and a first reference frame conversion component 1512, along with notch filters 1520 and 1530, further conversion components 1522 and 1532, and adjustable frequency components 1524 and 1534. The current controller in this example is implemented in a d,q reference frame synchronized with the grid (e.g., 60 Hz), in which the 60 Hz voltages and currents in the stationary reference frame are represented by DC values in the synchronous reference frame. Real and reactive power references are DC values, while ripple real and reactive power references are sinusoids with double the motor frequency synchronized with the motor controller. The first computation component 1502 calculates the I1 reference in the synchronous reference frame given the real and reactive power references according to FIG. 15C. The d and q-axis components of I1 are DC values.

The second reference computation component 1504 in FIG. 15A calculates the I2 reference in the synchronous reference frame given the ripple real and reactive power references according to FIG. 15C. The d and q-axis components of I2 are sinusoids with double the motor frequency. The d and q-axis components of I1 are supplied to the PI controller 1506 to produce a first modulation index component responsible for DC bus voltage regulation, while the d and q-axis components of I2 are supplied to a proportional (P) controller 1508 to produce the second modulation index component responsible for DC bus ripple voltage regulation. Both controllers 1506 and 1508 respectively produce modulation indices in the synchronous reference frame with subsequent transformation to the stationary frame by the conversion component 1512 after combination by the summer 1510. The measured feedback AFE current is separated into two components, including a first component at the grid frequency supplied to the PI controller 1506, and a second component supplied to the P controller 1508.

The table below shows current components with different load frequencies.

| Load Frequency | Ripple power Frequency | First Component of Current in ABC Frame | Second Component of Current in ABC Frame |
| --- | --- | --- | --- |
| 60 Hz | 120 Hz | 60 Hz positive sequence | 60 Hz negative sequence |
| 50 Hz | 100 Hz | 60 Hz positive sequence | 40 Hz negative sequence |
| 40 Hz | 80 Hz | 60 Hz positive sequence | 20 Hz negative sequence |
| 35 Hz | 70 Hz | 60 Hz positive sequence | 130 Hz positive sequence |
| 30 Hz | 60 Hz | 60 Hz positive sequence | 120 Hz positive sequence |
| 25 Hz | 50 Hz | 60 Hz positive sequence | 110 Hz positive sequence |
| 20 Hz | 40 Hz | 60 Hz positive sequence | 100 Hz positive sequence |
| 10 Hz | 20 Hz | 60 Hz positive sequence | 80 Hz positive sequence |

This table presents the current components at different motor frequencies. The fourth column shows the frequency of I2 in the stationary frame. However, being transformed to the synchronous reference frame synchronized with the grid, the second column shows the frequency of the I2 in the synchronous frame. When the motor frequency is in the range of 40 to 60 Hz, lagging ripple reactive power is injected in company with the required ripple real power injection.

When the motor frequency is less than 35 Hz, leading ripple reactive power is injected in company with the required ripple real power injection. The optimum filter scheme is realized by filtering on the DQ side when motor frequency is between 40 to 60 Hz as shown in FIG. 15A. In one example, the notch filter 1520 is tuned to remove components at double the motor frequency from I1 path, while band pass filter 1530 is tuned to pass components of double the motor frequency through I2 path. On the other side, the optimum filter scheme is realized by filtering on the stationary reference frame side when motor frequency is less than 35 Hz as shown in FIG. 15B. In this example, the notch filter 1520 filter is tuned to remove components at double motor frequency plus 60 Hz from I1 path, while band pass filter 1530 is tuned to pass components of double the motor frequency plus 60 Hz through I2 path. This will facilitate reduced interaction between the filtering bandwidth and the dynamic control bandwidth of the current controller. The second controller in certain implementations provides significant reduction in capacitor current ripple, wide motor speed range, improved harmonic performance, better current detection and control, all requiring use of a variable frequency filter structure. FIG. 15C shows an example first and second current reference calculation in the second controller of FIGS. 15A and 15B. The example of FIG. 15C includes a first component 1550 with dividers 1551 and 1554, constant values 1552 and 1555, as well as multipliers 1553 and 1556. A second component 1560 in FIG. 15C includes dividers 1561 and 1564, constant values 1562 and 1565, and multipliers 1563 and 1566. These example components and configurations thereof provide d and q-axis synchronous reference frame current reference signals or values as illustrated.

Figure 16A:
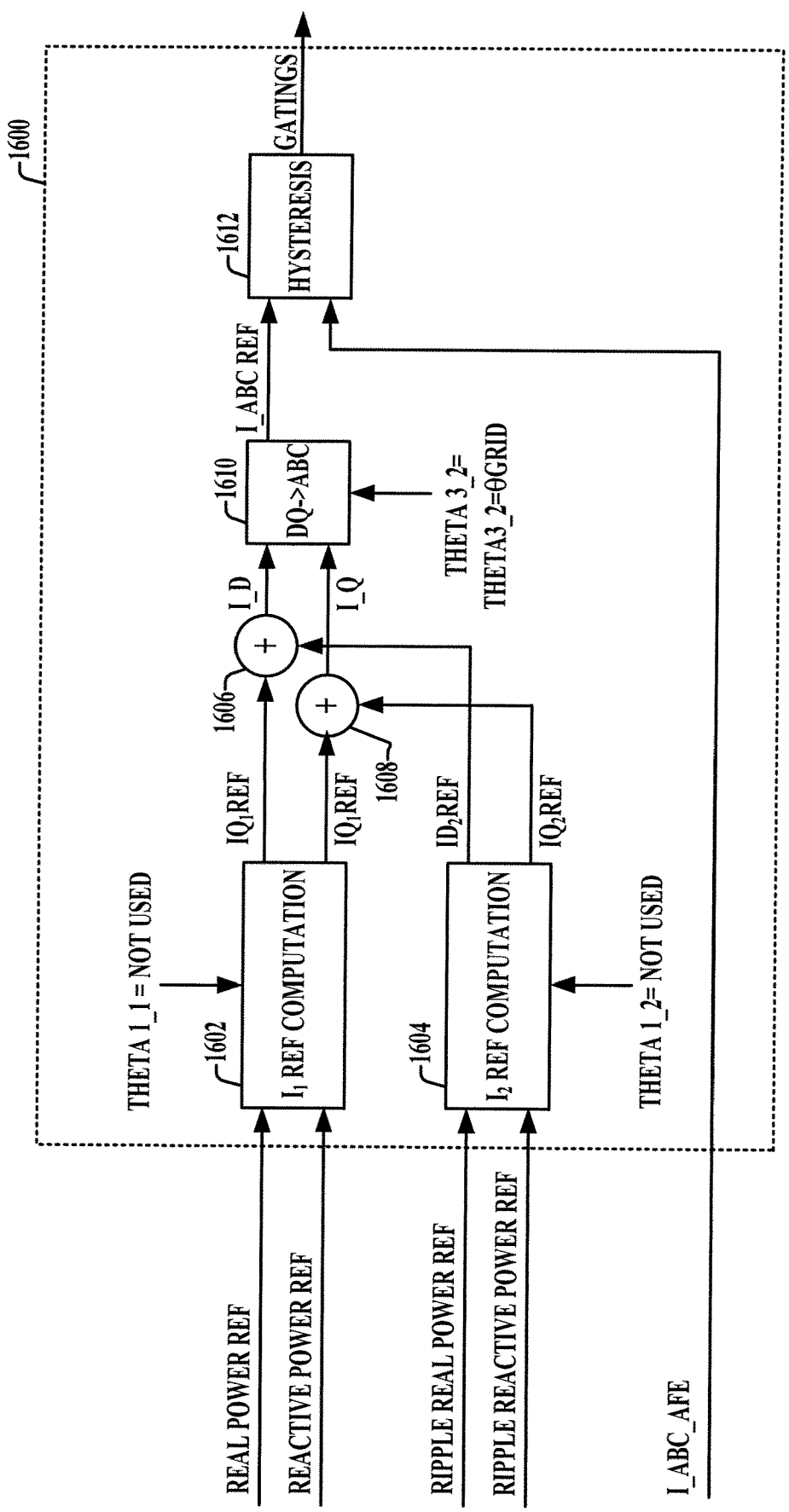
FIG. 16A is a schematic diagram.
Figure 16B:
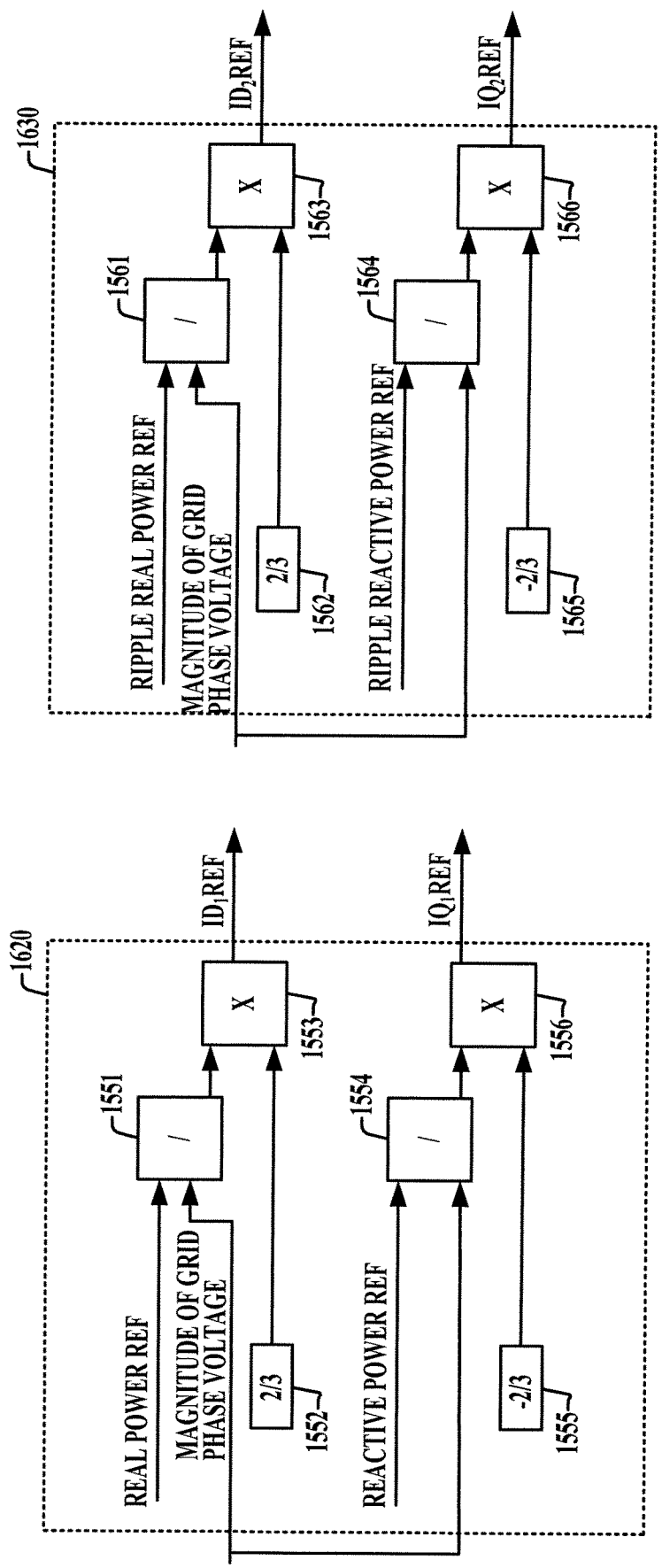
FIG. 16B is a schematic diagram.

Referring also to FIGS. 16A-16B, an example third controller 1600 is illustrated, such as an implementation of the example controller illustrated and described above in connection with FIG. 5. In order to avoid the need for current component detection, the third current controller (e.g., referred to herein as current controller 3) generates a reference current in the stationary reference frame and includes a hysteresis current controller 1612 that regulates the total current I1+I2. The example in FIG. 16A includes first and second current reference computation components 1602 and 64, summers 1606 and 1608, asynchronous to stationary reference frame conversion component 1610 and the hysteresis controller 1612. This example controller 1600 advantageously covers the whole motor frequency range. The tables below show the current components as motor frequency varies, including the case of injecting lagging ripple reactive power in the first table, as well as the case of injecting leading ripple reactive power in the second table. Either lagging scheme is chosen to prevent current frequency current components that causes PWM inefficiencies. FIG. 16A presents the proposed current controller 3, which generally follows the generic current controller block diagram presented in FIG. 13 with some differences, such as the absence of the PI controllers and the absence of the filtering scheme. I1, I2 references are computed according to the block diagram in FIG. 16B. In the example of FIG. 16A, the current references I1 and I2 are added and fed into the reference frame conversion from DQ to ABC using grid angle. Then the total current reference is fed to the hysteresis current controller 1612 to produce gating signals to operate the rectifier switching devices of FIG. 2. Advantages of the third controller in FIGS. 16A and 16B include significant reduction in capacitor current ripple, wide motor speed range, improved harmonic performance, no current detection scheme required. However, the main disadvantage is the variable frequency hysteresis current control.

Table of current components with different load frequencies for current controller 3 adopting lagging ripples reactive power.

| Load Frequency | Ripple power Frequency | First Component of Current in ABC Frame | Second Component of Current in ABC Frame |
| --- | --- | --- | --- |
| 60 Hz | 120 Hz | 60 Hz | −60 Hz |
| 50 Hz | 100 Hz | 60 Hz | −40 Hz |
| 40 Hz | 80 Hz | 60 Hz | −20 Hz |
| 35 Hz | 70 Hz | 60 Hz | −10 Hz |
| 30 Hz | 60 Hz | 60 Hz | 0 Hz |
| 25 Hz | 50 Hz | 60 Hz | 10 Hz |
| 20 Hz | 40 Hz | 60 Hz | 20 Hz |
| 10 Hz | 20 Hz | 60 Hz | 40 Hz |

Table of current components with different load frequencies for current controller 3 adopting leading ripples reactive power.

| Load Frequency | Ripple power Frequency | First Component of Current in ABC Frame | Second Component of Current in ABC Frame |
| --- | --- | --- | --- |
| 60 Hz | 120 Hz | 60 Hz | 180 Hz |
| 50 Hz | 100 Hz | 60 Hz | 160 Hz |
| 40 Hz | 80 Hz | 60 Hz | 140 Hz |
| 35 Hz | 70 Hz | 60 Hz | 130 Hz |
| 30 Hz | 60 Hz | 60 Hz | 120 Hz |
| 25 Hz | 50 Hz | 60 Hz | 110 Hz |
| 20 Hz | 40 Hz | 60 Hz | 100 Hz |
| 10 Hz | 20 Hz | 60 Hz | 80 Hz |

Figure 17:
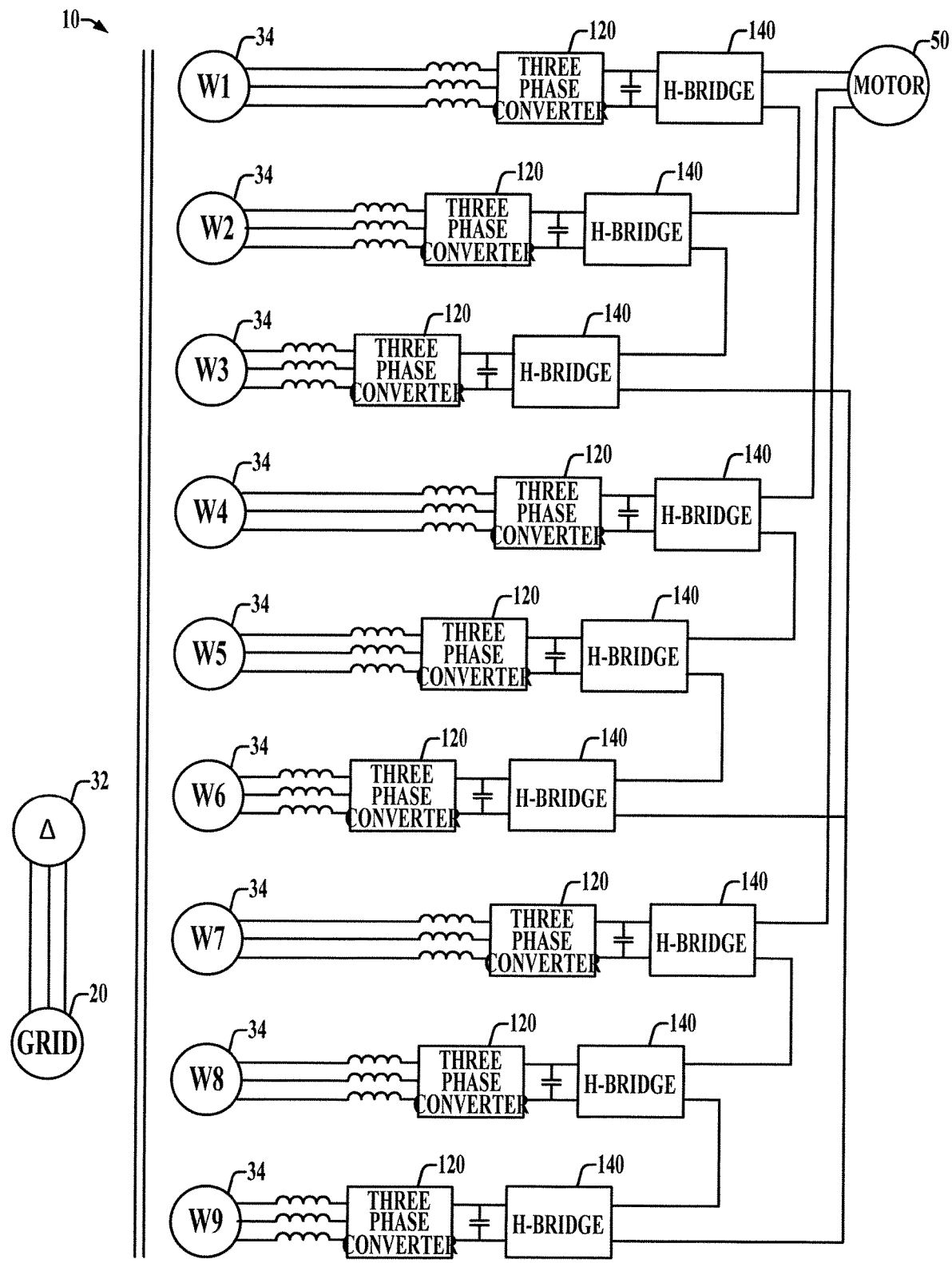
FIG. 17 is a schematic diagram.
Figure 18:
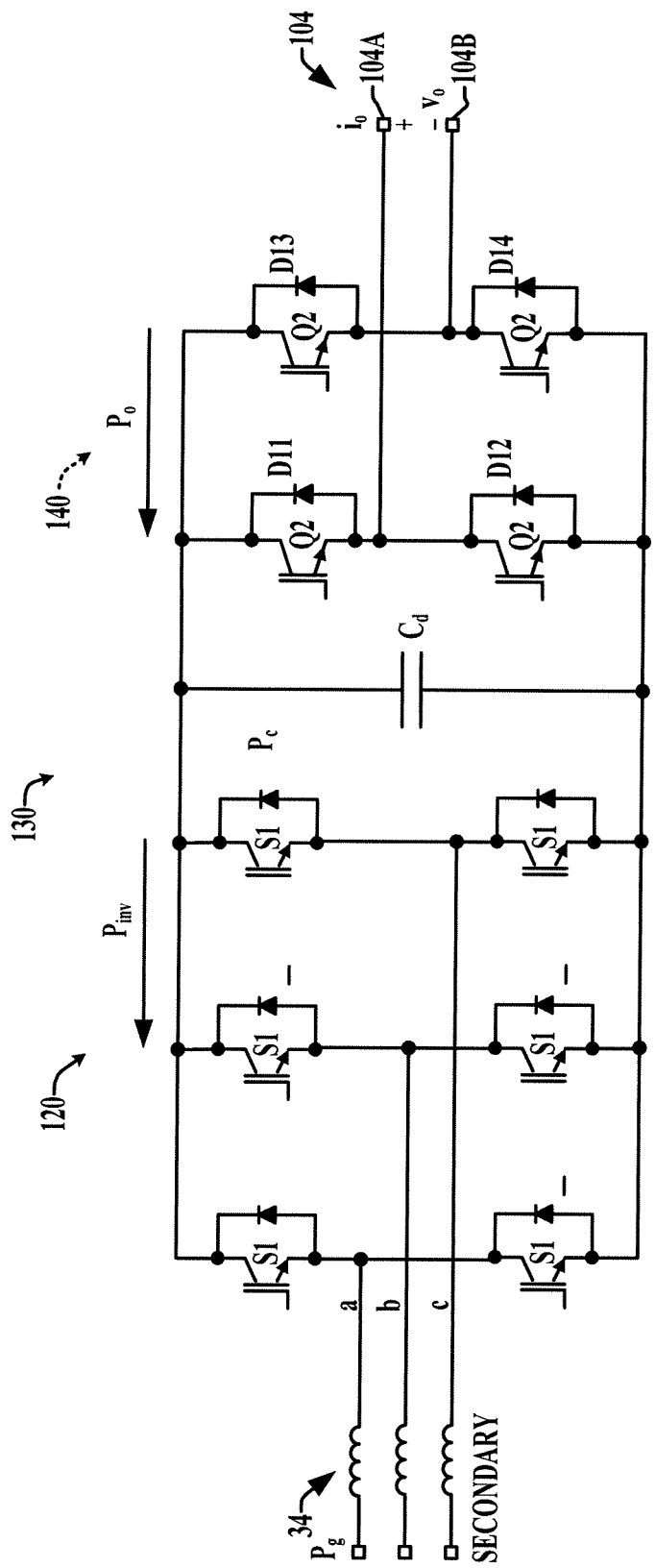
FIG. 18 is a schematic diagram.

Referring now to FIGS. 17-22, for a regenerative drive system, the mechanical energy transfer from the electrical machine to the DC bus through H bridge and finally flows to the power grid with the help of the active front end power inverter as shown in FIG. 17. The system diagram for one module stage is illustrated in FIG. 18. All stages are identical for full regeneration application. The three-phase rectifier is adopted for the active front end power converter for CHB drive. The DC capacitor is used to decouple the grid-tied three phase AFE converter 120 (e.g., operating as an inverter) and the H bridge inverter 140 (e.g., operating during regeneration as a rectifier or converter). The DC capacitor provides stable DC voltage for the active front end three phase inverter. The DC capacitor has two major roles, including compensating the instantaneous power unbalanced problem resulted from the unsymmetrical topology between three phase inverter and H bridge, and filtering high order harmonics resulting from the IGBT switching sideband harmonic. The following includes three possible implementations (e.g., FIGS. 3-5 above) to control the DC bus ripples through instantaneous power injection in regenerative mode operation of the system 10. A similar analysis can be applied for motoring mode using the active front end 120 of the given converter stages 100.

During regenerative mode, the instantaneous power of the H-bridge is described by the following equation (1).

$$\begin{aligned} p_o &= v_o i_o \\ &= V_o I_o \sin(\omega_m t + \phi_1)\sin(\omega_m t + \phi_2) \\ &= \frac{1}{2} V_o I_o \cos(\phi_2 - \phi_1) + \frac{1}{2} V_o I_o \cos(2\omega_m t + \phi_1 + \phi_2) \\ &= P_o + \tilde{p}_o \end{aligned} \quad (1)$$

A large second order ripple instantaneous power is injected by the electrical machine into the dc link of each stages. The active front end with the standard DC link control acts as a high resistance to these ripple power components. As a result, DC voltage ripples take place to fulfill load ripple power requirement. In order to decrease these DC voltage ripples, large DC bus capacitors are used. In one example, electrolytic capacitors are used, but these may suffer from poor reliability. The instantaneous power absorbed by the DC capacitor is expressed as $p_c$. The voltage ripple on the capacitor is governed by equation (2).

$$p_c = u_c i_c = \frac{1}{2} C_d \frac{d(u_c^2)}{dt} \quad (2)$$

The following assumes that power which power flows into the DC capacitor has the following mathematic format:

$$p_c = P_c \cos(2\omega_m t + \phi_3) \quad (3)$$

Based on this, the voltage and current on the DC capacitor can be expressed according to the following equation (4).

$$u_c = U_{dc}\sqrt{1 + \frac{P_c \sin(2\omega_m t + \phi_3)}{\omega_m C_d U_{dc}}} \quad (4)$$

When the DC capacitor is chosen to be large enough or the level of DC voltage increases, $$\frac{P_c}{\omega_m C_d U_{dc}}$$

term is small. On the other side, when the drive operates at frequencies lower than the nominal speed larger DC bus capacitors are required to keep DC bus ripples at the permissible range. Therefore, the required sizes of the DC bus capacitors are chosen based on the allowed ripples range and the frequency of operation of the load.

The equation can be expanded through Taylor series assuming $$\frac{P_c}{\omega_m C_d U_{dc}}$$

is a small enough as set forth in equations (5) and (6) below.

$$u_c \approx U_{dc} + \frac{1}{2}\frac{P_c \sin(2\omega_m t + \phi_3)}{\omega_m C_d U_{dc}} = U_{dc} + \tilde{u}_c \quad (5)$$

$$i_c = C_d \frac{du_c}{dt} \approx \frac{P_c \cos(2\omega_m t + \phi_3)}{\omega_m U_{dc}} \quad (6)$$

Figure 21:
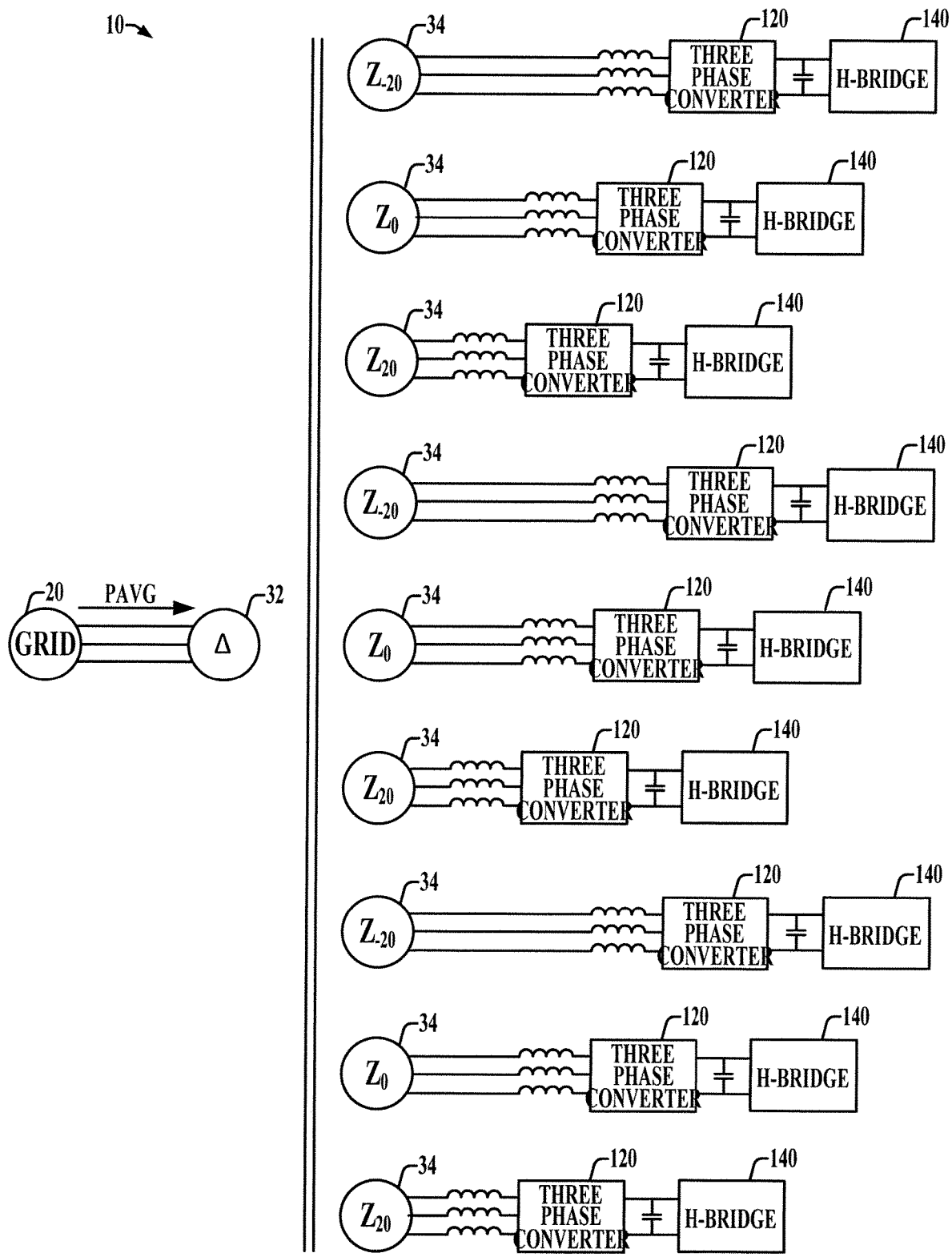
FIG. 21 is a schematic diagram.

Large second order current harmonic are provided by the DC bus capacitor. These ripple high current requirements pose reliability and design concerns. In order to use lower capacitor sizes and yet have allowable range of DC bus ripples while fulfilling the load requirement for ripple power, DC bus voltage control should be modified to allow grid interfaces to inject ripple power. FIGS. 19 and 20 show the three proposed approaches applied on one stage module feeding a single-phase load from one side and interfacing the grid from the other side. FIG. 19 shows the power flows through the system considering standard DC link voltage control. FIG. 20 shows the power flows through the system considering the proposed approaches. FIG. 21 presents one possible approach, where the power pulsations at stages of a given phase are synchronized. However, there is 120-degree shift between power pulsation at stages, for example, connected to Z-20 secondaries. As a result, ripple components can be canceled out and do not reflect to the primary.

To solve the instantaneous power unbalanced problem using DC bus voltage control, instantaneous, a PQ strategy is proposed to pump second harmonic power through the front-end inverter. Meanwhile the ripple power component will be cancelled out by the symmetric nature of the CHB inverter at the primary side of the transformer. According to the instantaneous power theory, any current vector aligned with voltage vector v will give rise to real power and any current vector aligned with voltage vector v will generate reactive power. If the current vector has zero speed compared to voltage vector, real and reactive power have only average components. However, if there is a relative speed between the current vector and the voltage vector, real and reactive powers have both average and ripple components. According to PQ theory, the current reference to be injected into the grid to deliver the required second order ripple power through the front-end inverter. Assuming enough power delivery capability is provided, the following represents the current reference.

$$i_p^* = \frac{\tilde{p}_o}{|v^+|^2}v^+ = \frac{\frac{1}{2}V_o I_o \cos(2\omega_m t + \phi_1 + \phi_2)}{|v^+|^2}v^+ \quad (7)$$

By solving the equation, the current reference in the rotating synchronous reference frame can be calculated as follows.

$$\begin{bmatrix} i_{inja} \\ i_{injb} \\ i_{injc} \end{bmatrix} = \frac{\frac{1}{2}V_o I_o \cos(2\omega_m t + \phi_1 + \phi_2)}{|v^+|^2}\begin{bmatrix} \cos(\omega_g t + \theta_a) \\ \cos(\omega_g t + \theta_a - 120°) \\ \cos(\omega_g t + \theta_a + 120°) \end{bmatrix} = \quad (8)$$

$$\frac{V_o I_o}{4|v^+|^2}\left(\begin{bmatrix} \cos(2\omega_m t + \omega_g t + \theta_a + \phi_1 + \phi_2) \\ \cos(2\omega_m t + \omega_g t + \theta_a - 120° + \phi_1 + \phi_2) \\ \cos(2\omega_m t + \omega_g t + \theta_a + 120° + \phi_1 + \phi_2) \end{bmatrix} + \right.$$

$$\left.\begin{bmatrix} \cos(2\omega_m t - \omega_g t - \theta_a + \phi_1 + \phi_2) \\ \cos(2\omega_m t - \omega_g t - \theta_a + 120° + \phi_1 + \phi_2) \\ \cos(2\omega_m t - \omega_g t - \theta_a - 120° + \phi_1 + \phi_2) \end{bmatrix}\right)$$

In this example, two side band $2\omega_m-\omega_g$ and $2\omega_m+\omega_g$ will be generated. To generate ripple power of only side band. The active front-end inverter should inject ripple reactive power as well and yet ripple reactive can be eliminated by the symmetrical nature of the CHB.

$$i_p^* = \frac{\tilde{p}_o}{|v^+|^2}v^+ + \frac{\tilde{q}_o}{|v^+|^2}v_\perp^+ = \quad (9)$$

$$\frac{\frac{1}{2}V_o I_o \cos(2\omega_m t + \phi_1 + \phi_2)}{|v^+|^2}\begin{bmatrix} \cos(\omega_g t + \theta_a) \\ \cos(\omega_g t + \theta_a - 120°) \\ \cos(\omega_g t + \theta_a + 120°) \end{bmatrix} +$$

$$\frac{\frac{1}{2}V_o I_o \sin(2\omega_m t + \phi_1 + \phi_2)}{|v^+|^2}\begin{bmatrix} \sin(\omega_g t + \theta_a) \\ \sin(\omega_g t + \theta_a - 120°) \\ \sin(\omega_g t + \theta_a + 120°) \end{bmatrix} =$$

$$\frac{V_o I_o}{2|v^+|^2}\begin{bmatrix} \cos(2\omega_m t - \omega_g t - \theta_a + \phi_1 + \phi_2) \\ \cos(2\omega_m t - \omega_g t - \theta_a + 120° + \phi_1 + \phi_2) \\ \cos(2\omega_m t - \omega_g t - \theta_a - 120° + \phi_1 + \phi_2) \end{bmatrix}$$

Figure 22:
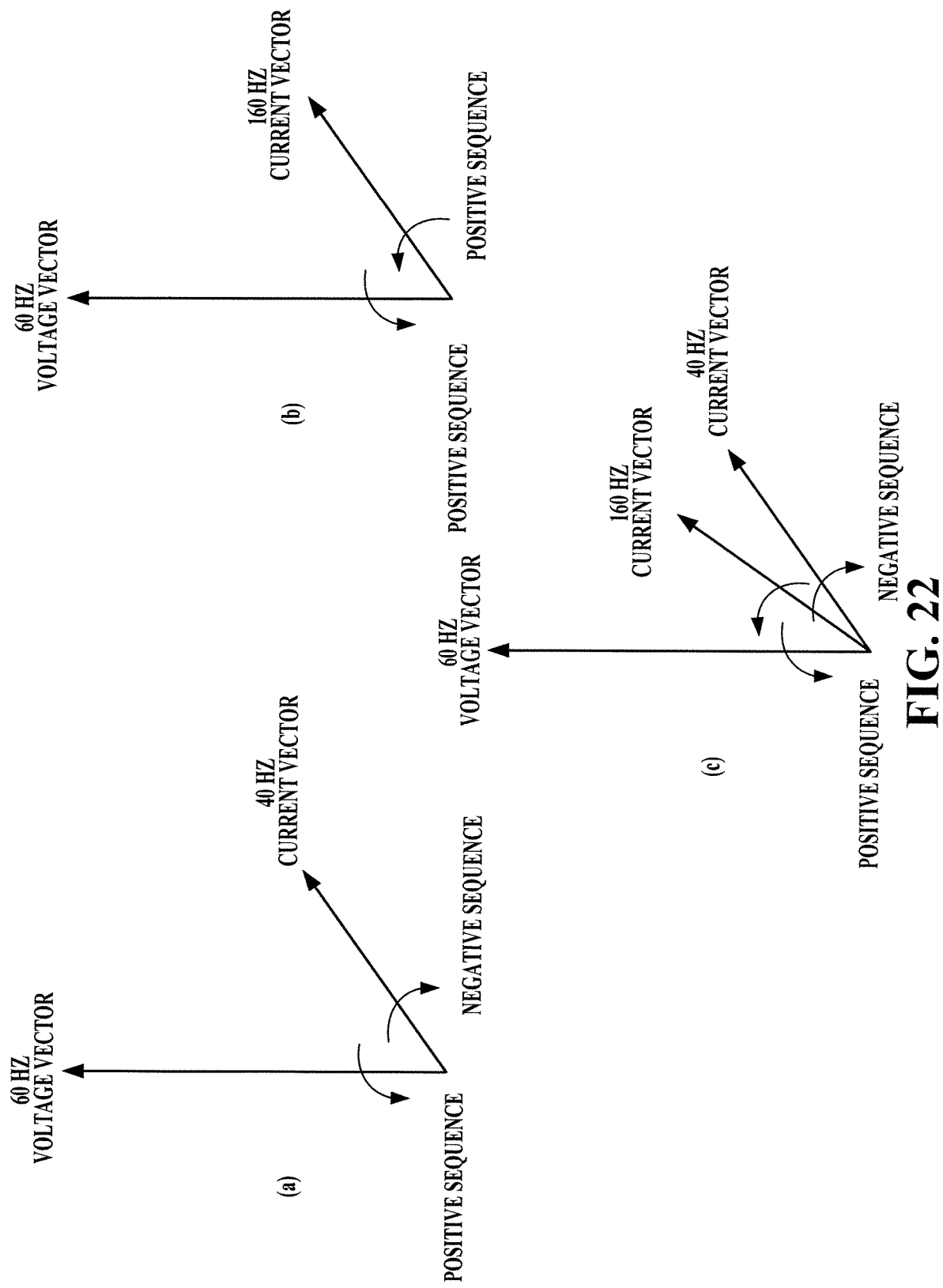
FIG. 22 is a schematic diagram.

FIG. 22 illustrates three means to inject ripple power assuming 60 Hz grid and the load frequency is 50 Hz in FIG. 22(a) the grid voltage vector rotates at 60 Hz in the positive sequence direction, the current vector rotates at 40 Hz in the negative sequence direction. The relative speed is 100 Hz to produce 100 Hz ripple power. It will also produce 100 Hz ripple reactive power. FIG. 22(b) the grid voltage vector rotates at 60 Hz in the positive sequence direction, the current vector rotates at 160 Hz in the positive sequence direction. The relative speed is 100 Hz to produce 100 Hz ripple power. It will also produce 100 Hz ripple reactive power. FIG. 22(c) the grid voltage vector rotates at 60 Hz in the positive sequence direction, the current vector consists of two components one rotates at 160 Hz in the positive sequence direction and the other one rotates at 40 Hz in negative sequence direction. The relative speed is 100 Hz to produce 100 Hz ripple power and no ripple reactive power. The example in FIG. 22(a) is advantageous when the load frequency approaches 60 Hz, while the case in FIG. 22b) is advantageous at low load frequency, due to constraints on the switching frequency of a medium voltage drive. High frequency will result in sideband harmonics due to the nonlinear performance of the PWM theory when carrier frequency is relatively low.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A power conversion system, comprising:
   a DC link circuit including at least one capacitor coupled between first and second DC link nodes;
   a switching rectifier, including rectifier switching devices individually coupled between a secondary circuit and one of the first and second DC link nodes; and
   a controller configured to:
     generate a real average DC current reference based on a DC bus voltage of the DC link circuit and a DC bus voltage setpoint,
     generate a reactive ripple current reference based on the DC bus voltage of the DC link circuit and a ripple angle of the DC link circuit, and
     generate rectifier switching control signals to operate the rectifier switching devices based on the real average DC current reference and the reactive ripple current reference.

2. The power conversion system of claim 1, wherein the power conversion system is a multiphase multilevel regenerative power converter, including three or more multilevel phase circuits, the individual phase circuits including multiple regenerative power stages with respective power stage outputs connected in series, the individual power stages comprising an instance of the DC link circuit, an instance of the switching rectifier, a switching inverter including inverter switching devices individually coupled between a respective one of the first and second DC link nodes and the respective power stage output.

3. The power conversion system of claim 1, wherein the controller is configured to:
   generate a real ripple current reference based on the DC bus voltage of the DC link circuit and the ripple angle; and
   generate the rectifier switching control signals based on the real average DC current reference, the real ripple current reference, and the reactive ripple current reference.

4. The power conversion system of claim 3,
   wherein the controller comprises:
     a first proportional-integral (PI) controller configured to generate a first modulation index reference based on the real average DC current reference, and
     a second PI controller configured to generate a second modulation index reference based on the real ripple current reference and the reactive ripple current reference; and
   wherein the controller is configured to generate the rectifier switching control signals based on the first and second modulation index references.

5. The power conversion system of claim 4, wherein the controller comprises:
   a first converter configured to convert the first modulation index reference from a synchronous reference frame to a first stationary reference frame modulation index reference;
   a second converter configured to convert the second modulation index reference from the synchronous reference frame to a second stationary reference frame modulation index reference; and
   a summer (316) configured to generate the rectifier switching control signals based on a sum of the first stationary reference frame modulation index reference and the second stationary reference frame modulation index reference.

6. The power conversion system of claim 4,
   wherein the controller comprises:
     a summer configured to generate a combined modulation index reference based on a sum of the first modulation index reference and the second modulation index reference, and
     a converter configured to convert the combined modulation index reference from a synchronous reference frame to a stationary reference modulation index reference in a stationary reference frame; and
   wherein the controller is configured to generate the rectifier switching control signals based on the stationary reference modulation index reference.

7. The power conversion system of claim 1, wherein the controller comprises:
   an average voltage controller configured to generate a first current reference in a stationary reference frame, based on the DC bus voltage of the DC link circuit and the DC bus voltage setpoint;
   a ripple voltage controller configured to generate a second current reference based on the DC bus voltage of the DC link circuit and the ripple angle of the DC link circuit;
   a summer configured to generate a combined current reference based on a sum of the first current reference and the second current reference; and
   a current controller configured to generate the rectifier switching control signals based on the combined current reference and a current setpoint.

8. A controller for a power converter, the controller comprising:
   a processor; and
   a memory that stores computer executable instructions, which, when executed by the processor, cause the processor to:
     generate a real average DC current reference based on a DC bus voltage of a DC link circuit and a DC bus voltage setpoint,
     generate a reactive ripple current reference based on the DC bus voltage of the DC link circuit and a ripple angle of the DC link circuit, and generate rectifier switching control signals to operate rectifier switching devices based on the real average DC current reference and the reactive ripple current reference.

9. The controller of claim 8, wherein the memory stores further computer executable instructions, which, when executed by the processor, cause the processor to:
generate a real ripple current reference based on the DC bus voltage of the DC link circuit and the ripple angle; and
generate the rectifier switching control signals based on the real average DC current reference, the real ripple current reference, and the reactive ripple current reference.

10. The controller of claim 9, wherein the memory stores further computer executable instructions, which, when executed by the processor, cause the processor to:
generate a first modulation index reference based on the real average DC current reference;
generate a second modulation index reference based on the real ripple current reference and the reactive ripple current reference; and
generate the rectifier switching control signals based on the first and second modulation index references.

11. The controller of claim 10, wherein the memory stores further computer executable instructions, which, when executed by the processor, cause the processor to:
convert the first modulation index reference from a synchronous reference frame to a first stationary reference frame modulation index reference;
convert the second modulation index reference from the synchronous reference frame to a second stationary reference frame modulation index reference; and
generate the rectifier switching control signals based on a sum of the first stationary reference frame modulation index reference and the second stationary reference frame modulation index reference.

12. The controller of claim 10, wherein the memory stores further computer executable instructions, which, when executed by the processor, cause the processor to:
generate a combined modulation index reference based on a sum of the first modulation index reference and the second modulation index reference;
convert the combined modulation index reference from a synchronous reference frame to a stationary reference modulation index reference in a stationary reference frame; and
generate the rectifier switching control signals based on the stationary reference modulation index reference.

13. The controller of claim 8, wherein the memory stores further computer executable instructions, which, when executed by the processor, cause the processor to:
generate a first current reference in a stationary reference frame, based on the DC bus voltage of the DC link circuit and the DC bus voltage setpoint;
generate a second current reference based on the DC bus voltage of the DC link circuit and the ripple angle of the DC link circuit;
generate a combined current reference based on a sum of the first current reference and the second current reference; and
generate the rectifier switching control signals based on the combined current reference and a current setpoint.

14. The controller of claim 8, wherein the memory stores further computer executable instructions, which, when executed by the processor, cause the processor to:

generate the real average DC current reference based on a DC bus voltage of the DC link circuit and a DC bus voltage setpoint for each given power stage of multiple regenerative power stages;
generate a reactive ripple current reference based on the DC bus voltage of the DC link circuit and a ripple angle of the DC link circuit for the given power stage; and
generate rectifier switching control signals to operate the rectifier switching devices based on the real average DC current reference and the reactive ripple current reference for the given power stage.

15. A non-transitory computer readable medium that stores computer executable instructions, which, when executed by a processor, cause the processor to:
generate a real average DC current reference based on a DC bus voltage of a DC link circuit and a DC bus voltage setpoint;
generate a reactive ripple current reference based on the DC bus voltage of the DC link circuit and a ripple angle of the DC link circuit; and
generate rectifier switching control signals to operate rectifier switching devices based on the real average DC current reference and the reactive ripple current reference.

16. The non-transitory computer readable medium of claim 15, further comprising computer executable instructions, which, when executed by a processor, cause the processor to:
generate a real ripple current reference based on the DC bus voltage of the DC link circuit and the ripple angle; and
generate the rectifier switching control signals based on the real average DC current reference, the real ripple current reference, and the reactive ripple current reference.

17. The non-transitory computer readable medium of claim 16, further comprising computer executable instructions, which, when executed by a processor, cause the processor to:
generate a first modulation index reference based on the real average DC current reference;
generate a second modulation index reference based on the real ripple current reference and the reactive ripple current reference; and
generate the rectifier switching control signals based on the first and second modulation index references.

18. The non-transitory computer readable medium of claim 17, further comprising computer executable instructions, which, when executed by a processor, cause the processor to:
convert the first modulation index reference from a synchronous reference frame to a first stationary reference frame modulation index reference;
convert the second modulation index reference from the synchronous reference frame to a second stationary reference frame modulation index reference; and
generate the rectifier switching control signals based on a sum of the first stationary reference frame modulation index reference and the second stationary reference frame modulation index reference.

19. The non-transitory computer readable medium of claim 17, further comprising computer executable instructions, which, when executed by a processor, cause the processor to:
generate a combined modulation index reference based on a sum of the first modulation index reference and the second modulation index reference;

convert the combined modulation index reference from a synchronous reference frame to a stationary reference modulation index reference in a stationary reference frame; and generate the rectifier switching control signals based on the stationary reference modulation index reference.

20. The non-transitory computer readable medium of claim 15, further comprising computer executable instructions, which, when executed by a processor, cause the processor to:

generate a first current reference in a stationary reference frame, based on the DC bus voltage of the DC link circuit and the DC bus voltage setpoint;

generate a second current reference based on the DC bus voltage of the DC link circuit and the ripple angle of the DC link circuit;

generate a combined current reference based on a sum of the first current reference and the second current reference; and generate the rectifier switching control signals based on the combined current reference and a current setpoint.

* * * * *